(12) United States Patent
Kawasaki et al.

(10) Patent No.: US 6,710,774 B1
(45) Date of Patent: Mar. 23, 2004

(54) MAP DISPLAY DEVICE

(75) Inventors: Koji Kawasaki, Kariya (JP); Motohiro Fukumoto, Toyoake (JP); Masatoshi Abou, Toyota (JP); Takashi Ichida, Anjo (JP); Kazuyoshi Yamada, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/563,243

(22) Filed: May 1, 2000

(30) Foreign Application Priority Data

| May 12, 1999 | (JP) | ......... 11-131701 |
| May 12, 1999 | (JP) | ......... 11-131702 |
| May 13, 1999 | (JP) | ......... 11-132866 |
| Oct. 7, 1999 | (JP) | ......... 11-287346 |
| Oct. 7, 1999 | (JP) | ......... 11-287347 |

(51) Int. Cl.[7] .................................. G06T 15/00
(52) U.S. Cl. ....................................... 345/419
(58) Field of Search ................ 345/419, 619; 701/208, 210, 212

(56) References Cited

U.S. PATENT DOCUMENTS

| 5,742,924 | A |   | 4/1998 | Nakayama |
| 5,757,290 | A |   | 5/1998 | Watanabe et al. |
| 5,999,879 | A |   | 12/1999 | Yano ........................... 701/208 |
| 6,057,856 | A | * | 5/2000 | Miyashita et al. .......... 345/633 |
| 6,175,802 | B1 |   | 1/2001 | Okude et al. ................ 701/208 |
| 6,324,469 | B1 | * | 11/2001 | Okude et al. ................ 701/208 |
| 6,388,688 | B1 | * | 5/2002 | Schileru-Key .............. 345/854 |

FOREIGN PATENT DOCUMENTS

| EP | 841537 | 5/1998 |
| JP | A-7-272196 | 10/1995 |
| JP | 9-62179 | 3/1997 |
| JP | 9-160487 | 6/1997 |
| JP | 9-171348 | 6/1997 |
| JP | 9-212083 | 8/1997 |
| JP | 9-222851 | 8/1997 |
| JP | A-H09-281889 | 10/1997 |
| JP | 9-304106 | 11/1997 |
| JP | 10-103997 | 4/1998 |
| JP | A-10-267680 | 10/1998 |

* cited by examiner

Primary Examiner—Phu K. Nguyen
(74) Attorney, Agent, or Firm—Posz & Bethards, PLC

(57) ABSTRACT

A map display device, which imparts a perspective feeling to a route guidance line so that it can be easily viewed, when buildings and roads are three-dimensionally displayed. A map display device having a control unit for three-dimensionally displaying a map and further three-dimensionally displaying a route guidance line on a road on the map. When the route guidance line is hidden by a building, the control unit displays overlapped portion of the route guidance line in a color different from the color of the portions that are not overlapping. In particular, the control unit draws picture by a semitransparent method in which the color displaying the route guidance line and the color displaying the building are alternately changing with a pixel as a unit on the video RAM (VRAM). In this case, a positional relationship becomes clear between the route guidance line and the building, and the route guidance line can be seen more clearly.

30 Claims, 30 Drawing Sheets

FIG. 13
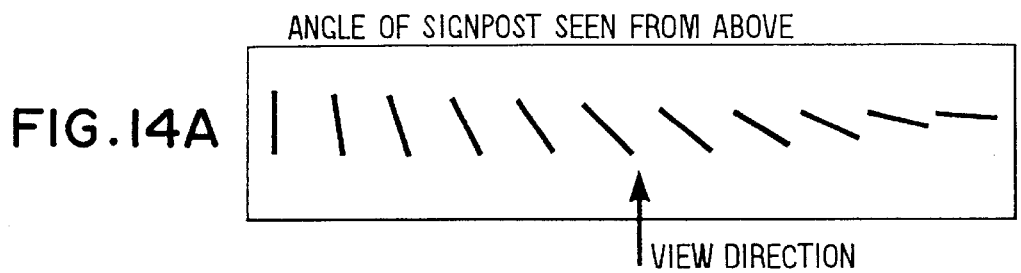
FIG. 14A
ANGLE OF SIGNPOST SEEN FROM ABOVE
VIEW DIRECTION
FIG. 14B
ANGLE OF SIGNPOST SEEN FROM VIEW DIRECTION
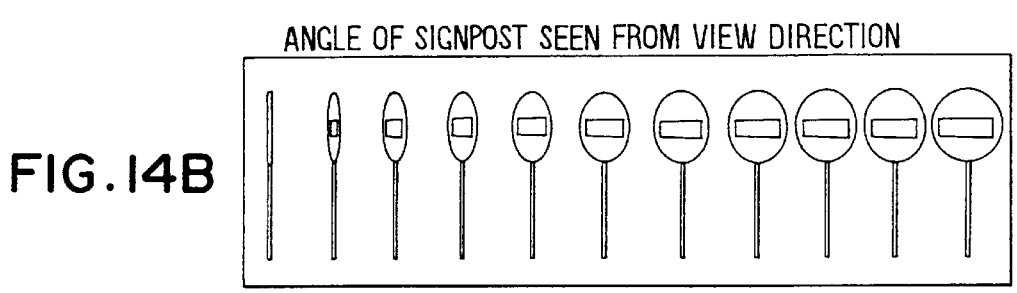

VIEWING POINT A

VIEWING POINT B

VIEWING POINT C

VIEWING POINT D

VIEWING POINT A

○

VIEWING POINT B

△

VIEWING POINT C

×

VIEWING POINT D

×

VIEWING POINT A ×

VIEWING POINT B ×

VIEWING POINT C △

VIEWING POINT D ×

MAP DISPLAY DEVICE

CROSS REFERENCE TO RELATED APPLICATION

This application is based upon Japanese Patent Application Nos. Hei. 11-131701 filed on May 12, 1999, Hei. 11-131702 filed on May 12, 1999, Hei. 11-132866 filed on May 13, 1999, Hei. 11-287346 filed on Oct. 7, 1999, and Hei. 11-287347 filed on Oct. 7, 1999, the contents of which are incorporated herein by reference.

BACKGROUND OF THE INVENTION

1. Field of the Invention

This invention relates to map display devices, and particular to a map display device for displaying buildings, roads and the like on a screen in a three-dimensional manner. More particularly, the invention relates to a map display device capable of displaying guidance line.

2. Related Art

In vehicular navigation devices as disclosed in, for example, Japanese Patent Laid-Open Nos. Hei 9-171348, Hei 9-62179 and Hei 9-212083, the buildings, roads and the like are displayed on the screen in a three-dimensional manner, so that the user can readily understand the map.

There has further been proposed a device, which enables the altitude of viewing point to be changed at the time of displaying the map in a three-dimensional manner, so that the map can be viewed more desirably. One of the examples can be represented by a vehicular navigation device which, as shown in FIG. 34A, permits the user to select the altitude of viewing point of a bird's-eye view out of several altitudes (e.g., three altitudes including low, intermediate and high).

In the three-dimensional map display in which buildings are three-dimensionally displayed on the screen, in general, when the viewing point is set to a low altitude, it often happens that the road or building, which the user wishes to see, is not displayed due to being hidden behind high buildings located in front. Conversely, when the viewing point is set to a high altitude, the stereo feeling or the perspective feeling is spoiled due to over lapping among the buildings. Such circumstances vary depending upon the buildings and roads displayed on the screen, their arrangements, topography, a portion of the map which the user wishes to see, etc. According to the above vehicular navigation devices, however, the user is allowed to select the viewing point out of only three altitudes, and is not often allowed to set the viewing point at an optimum altitude to meet various situations. When the altitude of viewing point is changed, further, the display of the screen greatly changes at one time, and the user finds it difficult to grasp a relationship between the display of picture of before being changed and the display of picture of after being changed.

There has further been proposed a vehicular navigation device, which enables the altitude of viewing point to be increased or decreased in many steps each by a predetermined altitude, as shown in FIG. 34B. According to this vehicular navigation device, the user is allowed to set the viewing point to a desired altitude to meet the circumstances on the display of map and objects. However, this vehicular navigation device still involves a difficulty in the operation in that when it is attempted to change the viewing point from a low altitude to a high altitude, the viewing point of a desired altitude is not readily set despite the altitude of the viewing point is successively increased by a predetermined altitude each time by manipulating a switch or the like. However, according to this vehicular navigation device, when the viewing point is set to a relatively high altitude, the map displayed on the screen may change little, despite the altitude of the viewing point is successively increased or decreased by a predetermined altitude each time. As a result, the user does not feel that the viewing point is ascending or descending, despite of manipulating the switch.

On the other hand, when the user sets a destination, the vehicular navigation device calculates an optimum route from the present position to the destination, and displays a route guidance line on the roads on the map that is three-dimensionally displayed. It is further possible to display information related to traffic jam, congestion and vacancy as lines (road information guidance lines) on the roads or outside the roads but along the roads, based upon the road traffic information obtained by the communications among the vehicles on the roads.

FIGS. 35A and 35B illustrate display screens describing a route guidance line in addition to the map that is three-dimensionally drawn. In FIGS. 35A and 35B, a building 1 is drawn as a stereo picture, and a route guidance line 3 (hatched belt portion) is drawn on the road 2. On the practically displayed screen, the whole route guidance line 3 appears in a color (e.g., red) different from the building 1 or the road 2. On the screen of FIG. 35B, the road 2 and the route guidance line 3 are so drawn that the width gradually decreases toward the distance so that a perspective feeling is obtained.

However, when the altitude of viewing point is decreased to nearly the height of a vehicle so as to obtain a display on the screen as viewed by the eyes of a driver in contrast with the screens shown in FIGS. 35A and 35B, then, the feeling of depth of the route guidance line 3 is lost, and it becomes difficult to see the route guidance line ahead of the turning point (ahead of the point turning to the left in FIGS. 35A and 35B).

The route guidance line 3 is drawn after the buildings and roads are three-dimensionally displayed on the screen. When the road 2, on which the route guidance line 3 will be drawn, is hidden by other buildings or roads, and the overlapped portion is not drawn on the road (which is not shown in FIGS. 35A, 35B), the route guidance line 3 is drawn on the buildings and on the roads for the overlapped portion. Accordingly, it becomes difficult to grasp a perspective relationship between the route guidance line 3 and other buildings or roads, or it becomes difficult to recognize the stereo shapes of the other buildings or roads. This inconvenience also happens when the road information guidance lines (e.g., lane guidance lines showing turn to the left, right, or go straight, and traffic jam information guidance lines) are to be displayed.

The map may further display traffic regulations information, such as one-way, speed limit, under construction, no parking, no stop, caution to falling rocks, etc. So far, the traffic regulations information has been drawn by bit map data. However, when the design drawn by bit map data is displayed afar beyond the viewing point in the three-dimensional display, the display of data of a particular sequence is inhibited and the data are thinned out. Conversely, when the above picture is displayed near the viewing point, the data are increased by, for example, tripling the data of each dot.

Therefore, the quality of display inevitably decreases, the design displaying the traffic regulations information becomes less recognizable, and it becomes difficult to watch the map display device during driving the car.

On the other hands, in a navigation device which two-dimensionally displays the map, the names of places and the names of buildings are also displayed by characters at the time of displaying the roads and buildings on the display means. In a navigation device which three-dimensionally displays the roads and buildings of a map, on the other hand, the names of places or the names of buildings are not usually displayed by characters but, instead, such names are displayed by characters when the user designates a desired building or the like.

In this constitution which displays the names of the places or the names of the buildings for each designation, however, it is not easy to comprehend the position of the desired building when the user has approached the destination. Besides, the user must repeat the designation operation many times to display the desired building, which is cumbersome.

SUMMARY OF THE INVENTION

This invention was accomplished in view of the above-mentioned circumstances, and has a first object of providing a map display device which, when the buildings and roads are three-dimensionally displayed, imparts perspective feeling to the route guidance lines and to the road information guidance lines so that they can be more favorably watched.

A second object of this invention is to provide a map display device which, when traffic regulations information is three-dimensionally displayed, enhances the quality of display so that they can be more favorably watched.

A third object of this invention is to provide a map display device which, when a map is three-dimensionally displayed, enables the viewing point to be set to a desired altitude maintaining good operability and enables the display on the screen to be smoothly changed accompanying the operation for changing the altitude of the viewing point.

A fourth object of this invention is to provide a map display device which three-dimensionally displays a map while also displaying the names of a plurality of buildings by character through a relatively simple operation.

According to one aspect of the present invention, a display control unit three-dimensionally displays guidance line when a map is three-dimensionally displayed on the screen. Even when the altitude of viewing point is set on the screen to an altitude which is as low as that of a vehicle, the user is allowed to easily recognize the guidance line and to easily grasp a perspective feeling of the buildings and roads.

According to another aspect of the present invention, a display control means displays, in a color different from the colors of other portions, the portions that are hidden behind facilities among the route guidance line when a map is three-dimensionally displayed on the screen. Therefore, the user is allowed to easily recognize the positional relationship among the guidance line and facilities. Besides, the shapes of the facilities are not smeared out by the guidance line, and do not become ambiguous.

According to still another aspect of the present invention, a screen control means finds a proportionally changing altitude by multiplying the present altitude of viewing point by a predetermined ratio of change every time when an altitude-changing instruction is input, and uses, as a new altitude of viewing point, the altitude that is obtained by increasing or decreasing the present altitude of viewing point by the proportionally changing altitude. Therefore, many altitudes of viewing points can be set in response to the input of the altitude-changing instruction. Besides, the amount of change in the altitude of viewing point increases with an increase in the altitude of viewing point, and the user is allowed to favorably set any desired altitude of viewing point.

Further, since the altitude of viewing point changes by a predetermined ratio with respect to the present altitude of viewing point, the user is allowed to gain a feeling of rising viewing point or lowering viewing point on the three-dimensionally displayed map upon the input of an instruction for changing the altitude. By continuously inputting the instruction for changing the altitude, further, the display on the screen can be smoothly changed.

According to far still another aspect of the present invention, it is allowed to select a display on the display unit for also displaying characters telling the names related to a plurality of buildings, or a display which does not display such characters. Therefore, the names of the buildings can be displayed relatively easily without requiring cumbersome designation operation. Besides, the names of the plurality of buildings can be simultaneously displayed instead of a single building.

According to the other aspect of the present invention, it is allowed to select a display for also displaying characters telling the names related to a plurality of buildings in addition to displaying the buildings in a three-dimensional manner but suppressing their height or displaying the buildings in plane shapes, or a display which displays the buildings without changing their height while displaying the characters.

BRIEF DESCRIPTION OF THE DRAWINGS

These and another objects, features and characteristics of the present invention will be appreciated from a study of the following detailed description, the appended claims, and drawings, all of which form parts of this application. In the drawings, same portions or corresponding portions are put the same numerals each other to eliminate redundant explanation. In the drawings:

FIG. 13 is a diagram illustrating traffic signposts drawn by using polygon in different sizes;

FIGS. 14A and 14B are diagrams each of which illustrating a change of view when the viewing point changes;

DESCRIPTION OF THE PREFERRED EMBODIMENTS

First Embodiment

A first embodiment in which the map display device of the invention is applied to a vehicular navigation device will now be described with reference to FIGS. 1 to 4.

Figure 1:
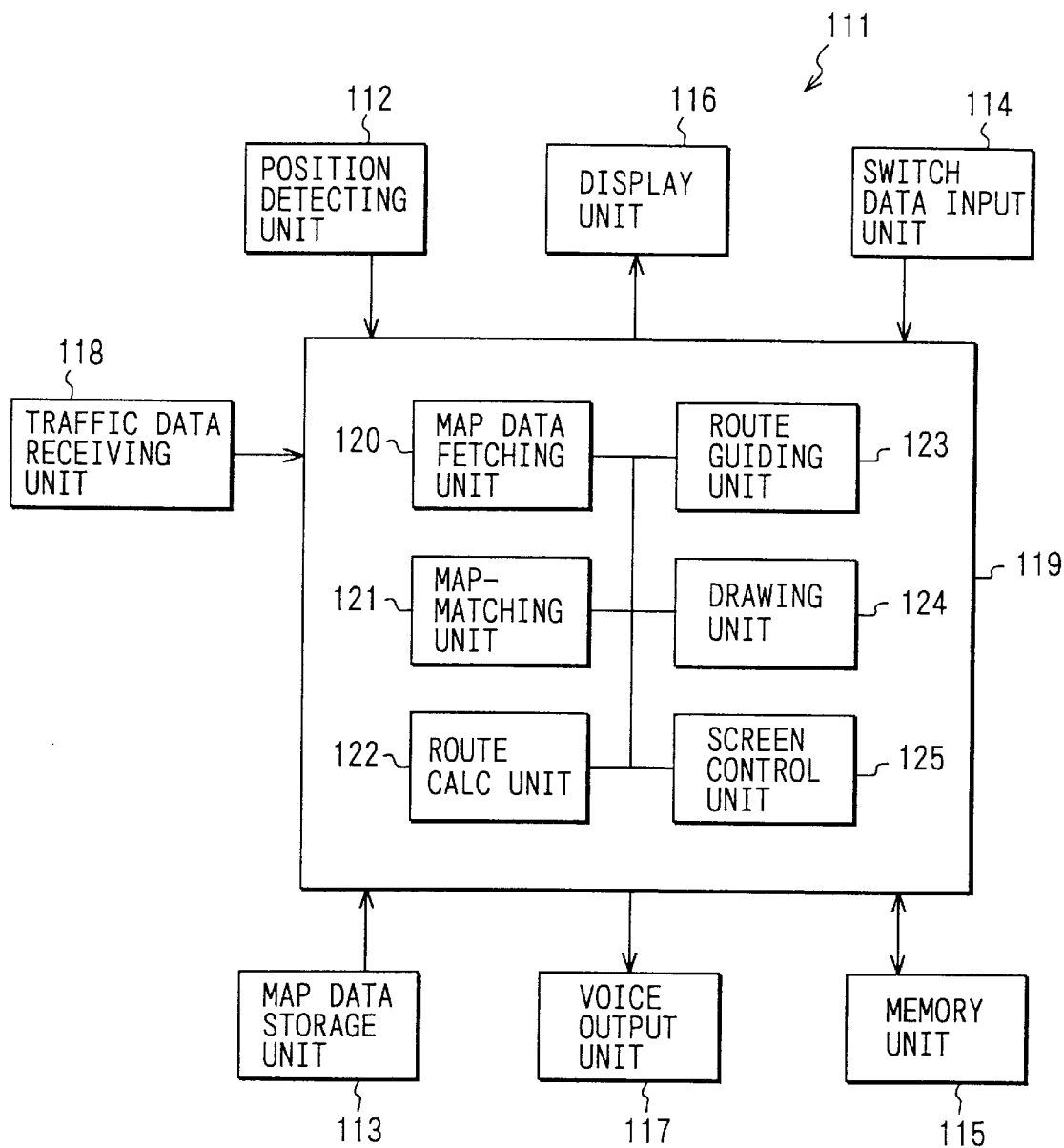
FIG. 1 is a schematic block diagram illustrating a vehicular navigation system of a first embodiment.

FIG. 1 is a schematic functional block diagram illustrating the whole constitution of a vehicular navigation device 111. In FIG. 1, a position detecting unit 112 is constituted by a GPS (global positioning system) receiver, a gyrosensor and a vehicle speed sensor, and calculates the present position of the vehicle. In the position detecting unit 112, the sensors include errors of different natures. Therefore, the position detecting unit 112 is so constituted as can be used while correcting the errors. If the present position can be calculated, these sensors need not be all provided but any one or more of these sensors may be provided.

A map data storage unit 113 is for inputting various data including so-called map-matching data, map data and object data for improving the precision for detecting the position, and is constituted by a DVD player, a hard disk device, a CD player and the like.

A switch data input unit 114 (corresponds to input means of the invention) includes switches arranged on the right, left, upper and lower sides of a display device that will be described later.

A memory unit 115 is constituted by, for example, a ROM or a RAM, the ROM storing an execution program for operating the vehicular navigation device 111, and the RAM temporarily storing temporary data when the program is being executed as well as map data obtained from the map data storage unit.

A display unit 116 is for displaying a map and a picture for selecting the destination, and is constituted by, for example, a liquid crystal display device. On the screen are displayed a mark representing the present position of the vehicle input from the position detecting unit 112, map data input from the map data storage unit 113, and additional data such as a route guidance line superposed on the map and a mark representing a point of setting a target.

A voice output unit 117 outputs voice for guide and explanation for operation on the screen.

A traffic data receiving unit 118 is a receiver in a road traffic information system such as VICS (vehicle information and communication system), and receives road traffic information sent from electronic wave beacon or optical beacon installed on the road, and receives road traffic information sent from a telephone or FM broadcast.

A control unit 119 (corresponds to display control means in the invention) is constituted by chiefly a microcomputer, and executes a route guide function for displaying the route guidance line by automatically selecting an optimum route from the present position to the destination, and executes the map-matching processing, synthesis of guide voice and drawing of a map depending upon the operation using the switch data input unit 114. The Dijkstra's algorithm has been known for automatically setting an optimum guide route.

The control unit 119 is constituted by a map data fetching unit 120, a map-matching unit 121, a route calculation unit 122, a route guiding unit 123, a drawing unit 124, a screen control unit 125, a video RAM (hereinafter abbreviated as VRAM) that is not shown, and the like.

The map-matching unit 121 specifies on which road the present position of the vehicle is existing by using position data of the vehicle detected by the position detecting unit 112 and road shape data of map data obtained from the map data storage unit 113. Here, the map data required by the map data fetching unit 120 are obtained from the map data storage unit 113. Further, the user operates the switch data input unit 114 to display a desired map thereby to set a destination. The route calculation unit 122 calculates the data related to the present position calculated by the map-matching unit 121, a start point specified by the user and an optimum route to the destination.

The route guiding unit 123 calculates points necessary for the route guide as well as a necessary route guide (whether to turn to the right or to the left) from the results of the above route calculation and the shape data of roads, position data of an intersection and position data of railroad crossing stored in the map data.

The drawing unit 124 draws a map of the present position, a rough sketch of expressways, enlarged map near the intersection, etc. according to the instruction from the screen control unit 125, and displays them on the display unit 116.

The map data fetching unit 120 fetches map data needed by the above processing units from the map data storage unit 113, and sends them to the processing units. The above processing is to executed by the ROM and RAM in the memory unit 115.

The map drawn by the drawing unit 124 is a three-dimensional map (hereinafter referred to as three-dimensional map), and the buildings are drawn in a three-dimensional manner from the shape data and height data of buildings stored in the map data. A multi-level crossing, too, is three-dimensionally drawn based on the shape data of roads, etc. As the vehicle proceeds based on the data calculated by the route guiding unit 123 and arrives at a position at where the route is to be guided, a desired picture is drawn by the drawing unit 124 or predetermined voice is sounded by the voice output unit 117 to guide the user to the destination.

The action of the above constitution will now be described with also reference to FIGS. 2 to 4B.

The user, who wishes to display a guide route to the destination on the display unit 116 of the vehicular navigation device 111, operates the switch data input unit 114 to display a selected picture of the destination on the display unit 116 and inputs the destination, etc. After the destination has been input, the route calculation unit 122 calculates the route, the control unit 119 processes the display of route guidance line according to a flowchart shown in FIG. 2, and the display unit 116 three-dimensionally displays a route guidance line together with the three-dimensional map as shown in FIG. 4A or 4B (dots representing points A to I are not displayed).

Figure 4A:
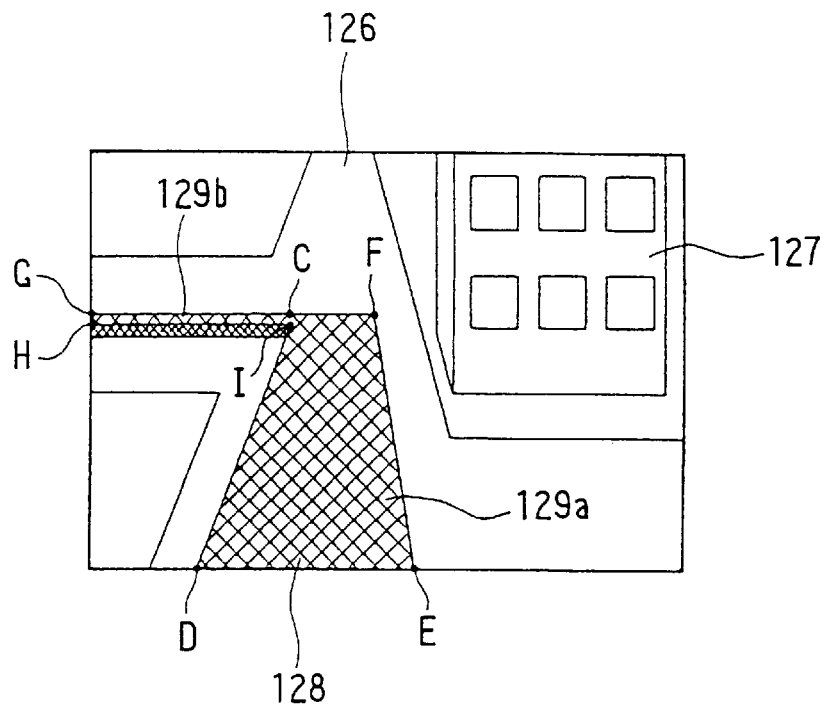
FIGS. 4A and 4B are diagrams each of which illustrating a screen on which a map is three-dimensionally drawn of the first embodiment.
Figure 4B:
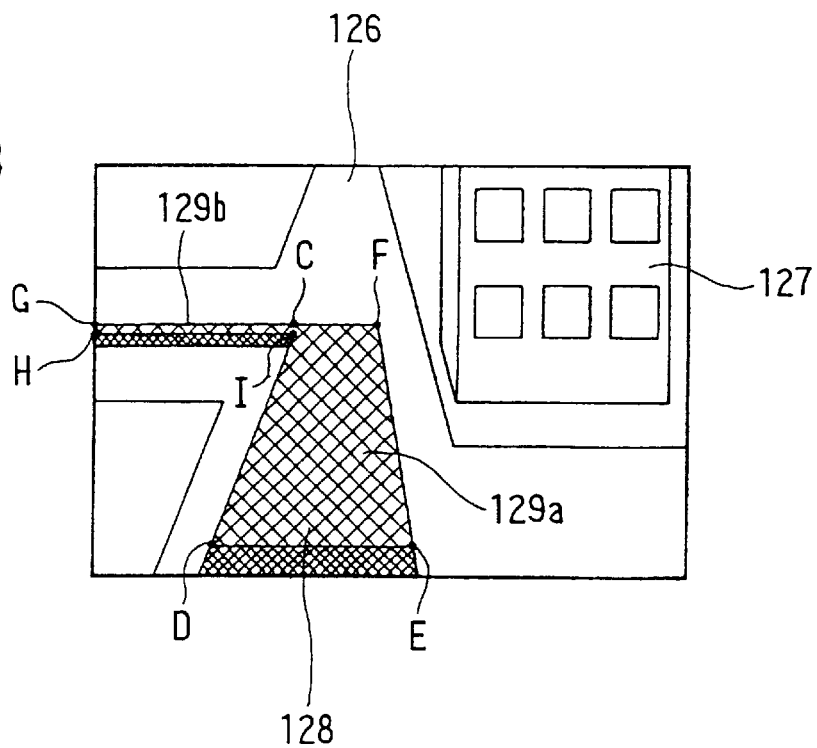

In FIGS. 4A and 4B, the building 127 is three-dimensionally shown along the road 126, and a route guidance line 128 (lattice-like hatched zone) is three-dimensionally shown on the road 126. Here, a coarse lattice-like hatched zone is uniformly smeared in, for example, red of a bright tone, and fine lattice-like hatched zone is uniformly smeared in, for example, red of a dark tone. The route guidance line 128 is constituted by a combination of a trapezoidal polygon 129a formed by connecting points C, D, E and F in this order and a trapezoidal polygon 129b formed by connecting points G, H, I and C in this order.

According to the drawing method shown in FIG. 4B, an end surface of the route guidance line 128 is shown on the nearest side of the road 126 (lower side in the drawing). Therefore, even when, for example, the route guidance line 128 stretches straight from the closest side of the road 126 to the farthest side thereof (upper side in the drawing) without turning, the route guidance line 128 appears three-dimensionally.

Figure 2:
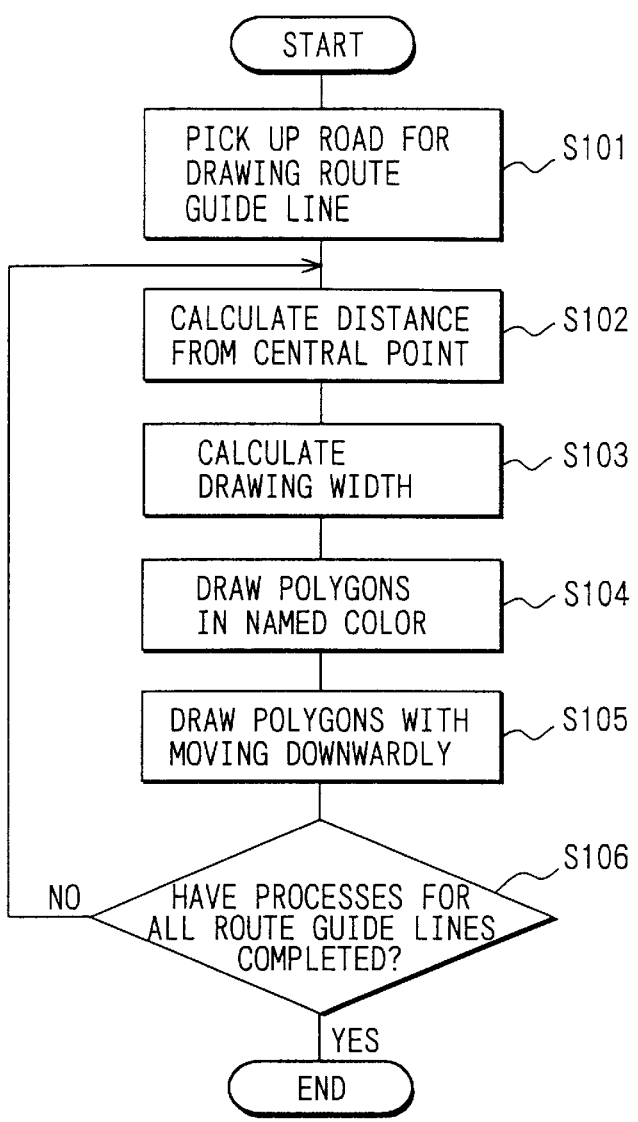
FIG. 2 is a flowchart illustrating a process of displaying route guidance lines.

Referring to FIG. 2 illustrating the processing for displaying the route guidance line 128, the route guide unit 123 in the control unit 119 calculates the road that needs guidance (e.g., specific number attached to the road that is to be guided) for the guide route calculated by the route calculation unit 122 based on the present position of the vehicle and the destination that is input. Then, the route guide unit 123 compares the road with the road data in the map data fetched by the map data fetching unit 120, and picks up a road having the same data (step s101).

Then, the control unit 119 calculates how far the road that is picked up is away from the central point of the map that is drawn, and calculates the width for drawing the road when the map is three-dimensionally displayed. Here, the central point of the drawing is a central coordinate point of VRAM, and the display unit 116 displays a frame obtained by partly cutting the VRAM. When the map is three-dimensionally displayed, the width for drawing the route guidance line 128 is determined based upon the width for drawing the road and the distance by which the route guidance line 128 is separated away from the central point of the map that is drawn (step S102).

Figure 3:
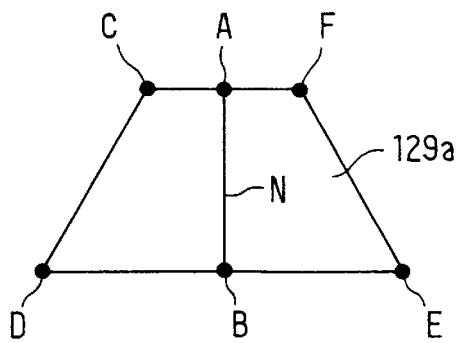
FIG. 3 is a diagram for explaining a polygon.

At step S103, the control unit 119 calculates the drawing width at both end coordinate points of the route guidance line 128. FIG. 3 illustrates a polygon 129a determined by the points C, D, E and F shown in FIGS. 4A, 4B. In FIG. 3, the control unit 119 calculates the length of the line segment CF and the length of the line segment DE by multiplying the width of the route guidance line 128 at the central point of the drawing by a coefficient determined from the distance of the central point of the drawing to the points A and B of the polygon 129a existing on the center line N (road line N) of the road. The coordinate positions of the points C, D, E and F are so determined that the points A and B are at the central points of the line segments CF and DE, so that the route guidance line 128 is drawn symmetrically to the road line N.

The drawing unit 124 then draws the polygon 129a in a state of being smeared in red by the edge list method or the trapezoidal fill method (step S104) and, then, draws the polygon 129a in a manner of being deviated downward by a predetermined amount on the screen (step S105). Based upon the judgment at step S106, the above processing is repetitively affected for all polygons (polygons 129a and 129b in FIGS. 4A and 4B) constituting the route guidance line 128, so that the route guidance line 128 is three-dimensionally displayed.

As a result, the route guidance line 128 shown in FIGS. 4A and 4B is constituted by two cubes corresponding to the polygons 129a and 129b, and, hence, the color and the like of the route guidance line 128 can be easily changed with the cubes based on the polygons 129a and 129b as a unit. Further, the user is allowed to change the altitude of viewing point of the three-dimensionally displayed map by manipulating the switch data input unit 114. In this case, the route guidance line 128 is displayed in a form that is viewed in match with the altitude of viewing point.

According to this embodiment as described above, when the map is three-dimensionally displayed, the route guidance line is partly or entirely displayed in a three-dimensional manner, and the user may easily recognize a positional relationship between the route guidance line 128 and the building 127 or the road 126. In particular, the route guidance line 128 can be easily viewed even concerning the display portions (e.g., portion of the polygon 129b shown in FIGS. 4A, 4B) ahead of a point turning to the right or to the left from the altitude of viewing point nearly the same as the height of the vehicle, which, so far, could not be easily viewed with the conventional display. When the altitude of viewing point is changed, further, the route guidance line 128 is displayed in a form that can be viewed in match with the altitude of viewing point, and, hence, a three-dimensional display is obtained without compromising visual aesthetics of the display.

Second Embodiment

Figure 5A:
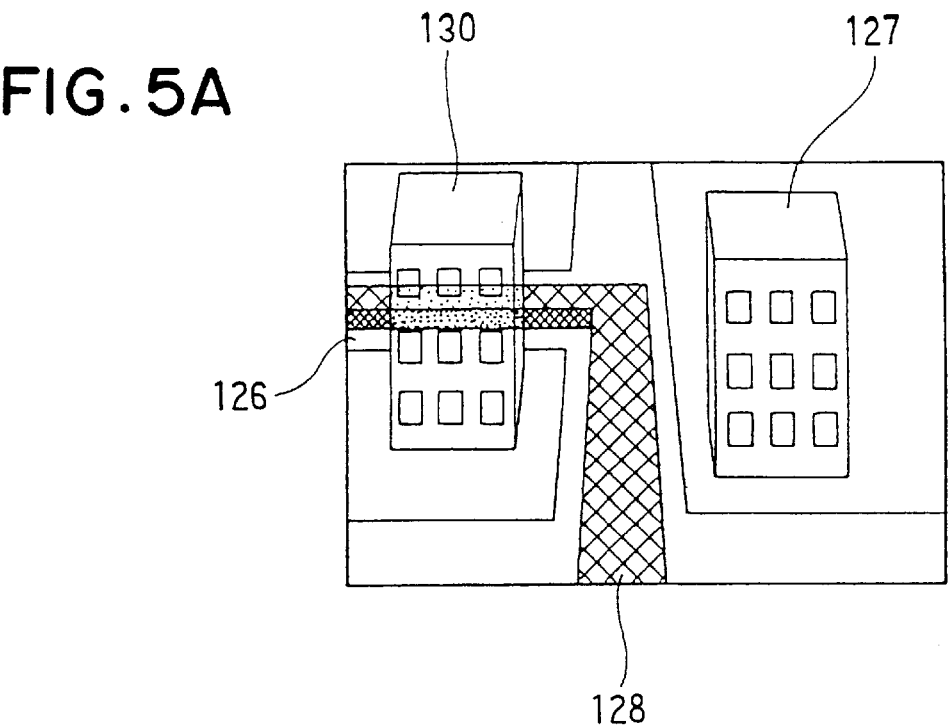
FIG. 5A is a diagram illustrating a screen on which a map is three-dimensionally drawn of a second embodiment.
Figure 5B:
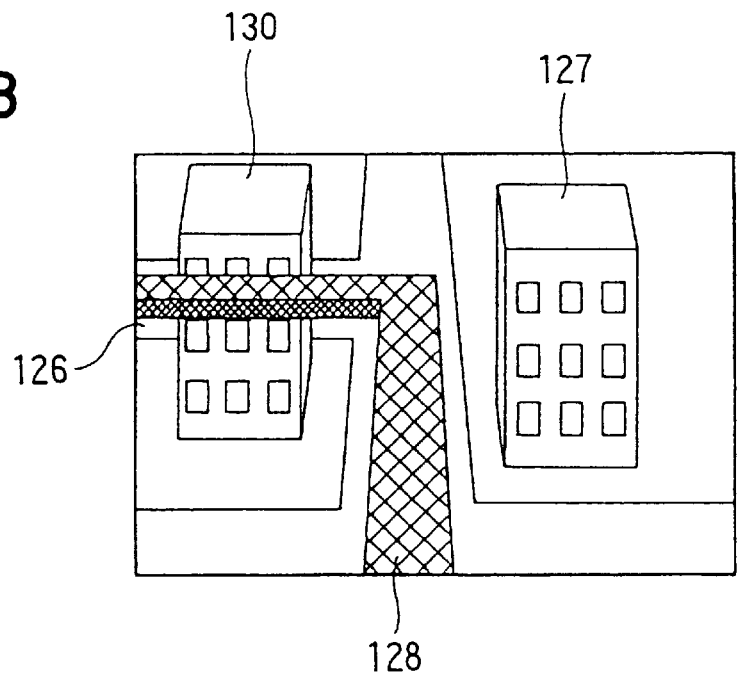
FIG. 5B is a comparison with respect to FIG. 5A.

Next, described below with reference to FIGS. 5A and 5B is a second embodiment in which the invention is applied to the vehicular navigation device 111.

When a map is three-dimensionally displayed as shown in FIGS. 5A and 5B, a building 130 that is three-dimensionally displayed may often be drawn in front of the road 126 on which the route guidance line 128 is to be drawn, and the road 126 may be partly concealed by the building 130. When the route guidance line 128 is drawn after the map is three-dimensionally displayed, the overlapping portion of the route guidance line 128 and the building 130 is smeared out by the route guidance line 128 as shown in FIG. 5B.

In drawing the polygons in a specified color (red), however, the control unit 119 in the vehicular navigation device 111 of this embodiment judges whether the polygons overlap on the building based on the shape data and height data of the building 130 and the position data of the road 126 stored in the map data. When it is judged that the polygons are overlapping, the control unit 119 draws the overlapping portion in a color (corresponds to display color control in the invention) different from the color of the portions that are not overlapping.

In this case, the overlapped portion is drawn in a semi-transparent manner. That is, concerning the overlapping portion, the color of the route guidance line and the color of the building are alternately changed on the VRAM with a pixel as a unit, so that the user can faintly see the route guidance line 128 on the screen through the building 130 as shown in FIG. 5A. On the route guidance line 128 shown in FIG. 5A, a dotted portion (overlapping the building 130) is the portion drawn in a semitransparent manner.

According to this embodiment, a positional relationship between the route guidance line 128 and the building 130 is clarified, and at least the outer shape of the building 130 can be recognized even for the portion where the route guidance line 128 and the building 130 are overlapping one upon the other. Since the overlapping portion is drawn in a semitransparent manner, the route guidance line 128 is displayed in a manner in which it can be seen through the building 130 without compromising visual aesthetics of the display, and the window frames of the building 130 can be recognized more clearly, providing a more effective perspective view.

In this embodiment, further, the display color is controlled upon three-dimensionally displaying the route guidance line 128 and, hence, the route guidance line 128 can be seen more easily. The user is allowed to select whether the display color be controlled upon operating the switch data input unit 114.

Third Embodiment

Next, a third embodiment of the invention will be described with reference to FIGS. 6A and 6B. The constitution of the vehicular navigation device 111 is as shown in FIG. 1.

When the user operates the switch data input unit 114 to select the VICS display, the control unit 119 draws the instructions based on the road traffic data included in the electromagnetic beacon signals or optical beacon signals received by the traffic data receiver 118, i.e., draws information related to traffic jam, congestion or vacancy, on the three-dimensionally displayed map as lines (hereinafter referred to as road information guidance lines) on the roads or outside the roads but along the roads. The conventional VICS display picture has been drawn by two-dimensional road information guidance line 131 as shown in FIG. 6B.

Figure 6A:
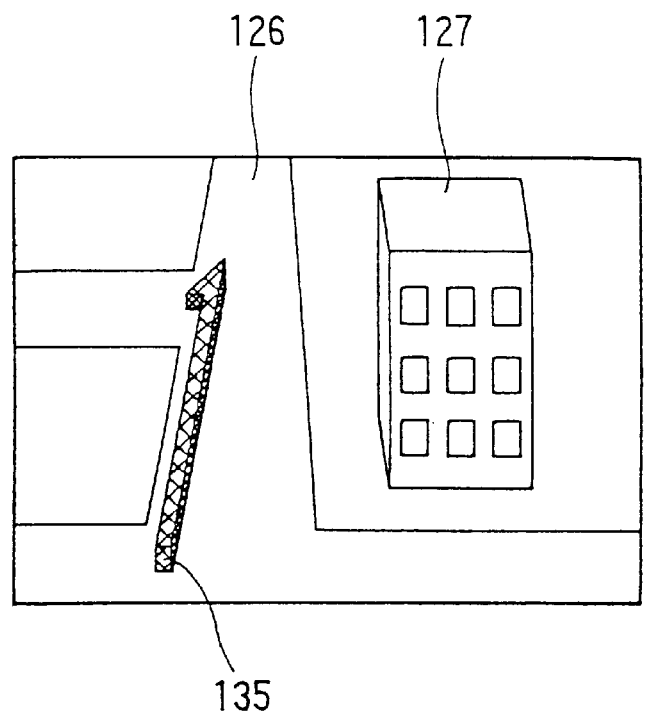
FIG. 6A is a diagram illustrating a screen on which a map is three-dimensionally drawn of a third embodiment.
Figure 6B:
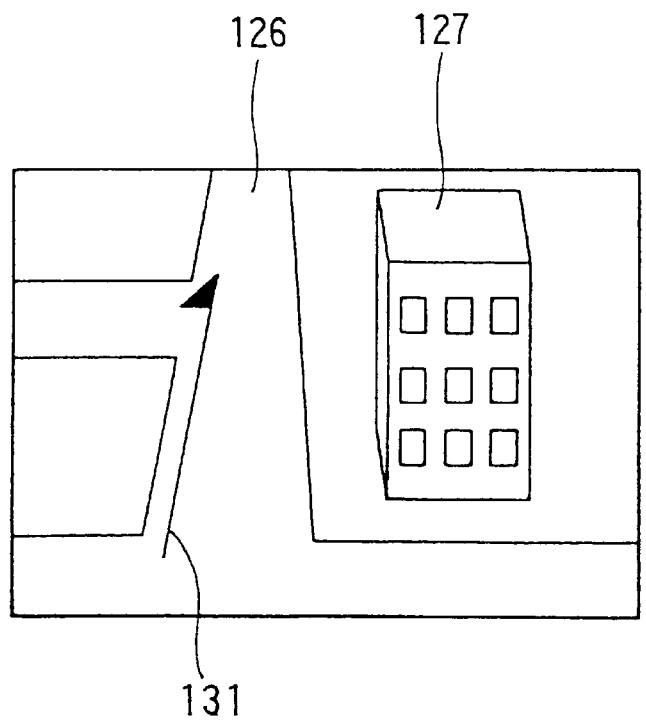
FIG. 6B is a comparison with respect to FIG. 6A.

As shown in FIG. 6A, the control unit 119 draws the road information guidance line 135 in a three-dimensional manner and draws the portion overlapping the building in a semitransparent manner in the VICS display like in the first and second embodiments described above. Therefore, this embodiment, too offers the same effects as those of the above embodiments, and the user is allowed to easily recognize information related to traffic jam, congestion and vacancy on the VICS display.

Fourth Embodiment

Next, a fourth embodiment of the invention will be described with reference to FIGS. 7A, 7B and 7C.

This embodiment has a feature in that the control unit 119 three-dimensionally displays facilities such as convenience store, gas station, etc. and displays marks for identifying the facilities on the surface thereof. So far, such facilities have been indicted by two-dimensional facility marks 132 as shown in FIG. 7C. When the viewing point is set to a low altitude, therefore, the user could not see such facilities on the screen.

Figure 7A:
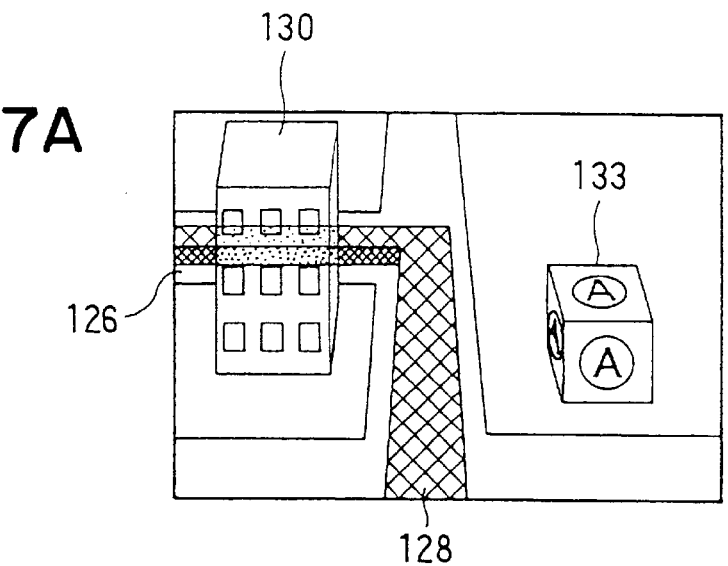
FIGS. 7A and 7B are diagrams each of which illustrating a screen on which a map is three-dimensionally drawn of a fourth embodiment.

As shown in FIG. 7A, on the other hand, the control unit 119 draws such facilities 133 as cubes, and displays the facility identification marks on the surfaces of the facilities 133. The facilities 133 are drawn on the cubes so as to be seen in match with the viewing point of an altitude set by the user. Therefore, the facilities can be easily seen even when they are displayed so as to be viewed at an altitude nearly equal to the height of the vehicle, and the facility identification marks can be recognized irrespective of the viewing point.

Figure 7B:
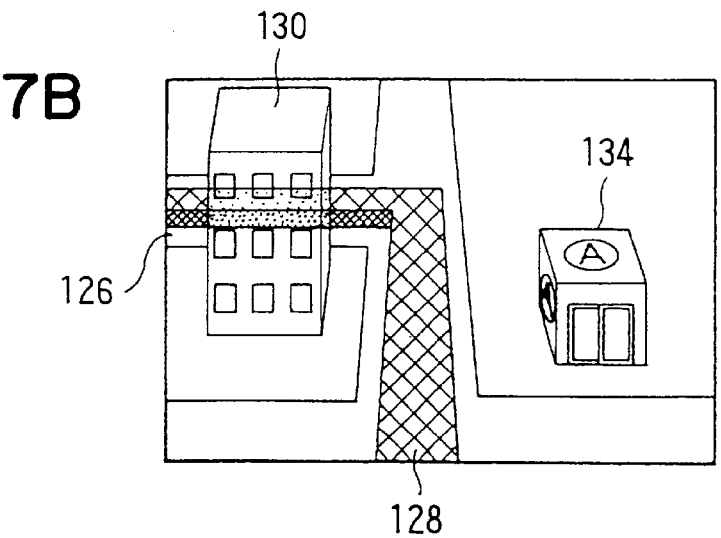
Figure 7C:
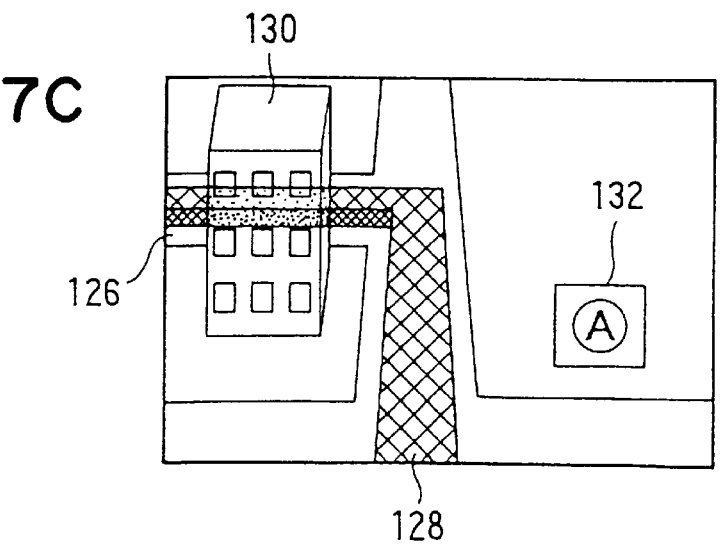
FIG. 7C is a comparison with respect to FIGS. 7A and 7B.

As shown in FIG. 7B, further, the control unit 119 displays an entrance/exit on the surface of the three-dimensionally displayed facility 134 in a direction in which the entrance/exit physically exists in the facility. As a result, the user is may identify the facility 134 from the location of the entrance/exit in addition to the facility identification mark, enabling the facility to be more easily recognized. In addition, having knowledge of the location of the entrance/exit may facilitate the user in locating a suitable parking place in proximity to facility 134.

Fifth Embodiment

Next, a fifth embodiment of the present invention will be described with reference to FIGS. 8 to 16B. In the fifth embodiment, the control unit 119 displays, on the map, traffic regulations information such as one-way, speed regulations, under construction, no parking/stopping, caution to falling rocks, and "Traffic is Jamming" obtained from the VICS. The traffic regulations information, such as one-way, no entrance, speed regulations, are displayed by the same designs as the signposts. When the map is three-dimensionally displayed, the display designs are drawn by using polygons.

Referring to FIG. 13, the design of a signpost such as of no entrance that appears to be a circle when viewed from the front is drawn by using a polygon 36. When the display design is thus constituted, e.g., when the signpost is displayed near the viewing position or is displayed at a distance in the three-dimensional display, the display quality is deteriorated significantly less than when the display design is constituted using bit map data.

For the purpose of comparison, FIG. 13 further illustrates an example of when the display design is drawn using bit map data as in the related art. In this case, when the size of the display near the viewing point is to be doubled from a reference size, each dot is displayed by 4 dots of 2×2. As shown, therefore, the outer shape of the circle becomes coarse and rugged. Conversely, when the design is to be displayed in a small size at a distance, the data are thinned out arousing the same problem.

On the other hand, when the display drawn by using the polygon 36 is to be enlarged or contracted, the distance among coordinates representing vertices of polygons may be changed, without reducing or increasing the amount of data. Even when the size of the display is doubled as shown in FIG. 13, the outer shape of the circle can be smoothly expressed in a unit of a dot.

Referring to FIG. 14, further, even when the direction of viewing the signpost is changed from the front through up to 90 degrees, the display design can be so constituted that the signpost naturally turns into an elliptic shape depending on a change in the angle. When the bit map data are used in such a case, the data of the display sequence must be thinned out much for drawing a narrow ellipse, causing the display quality of curves to be greatly deteriorated. When the polygon 136 is used, on the other hand, the curve of an ellipse is drawn with fine dots and the display quality can be improved compared with when bit map data are used.

Figure 8:
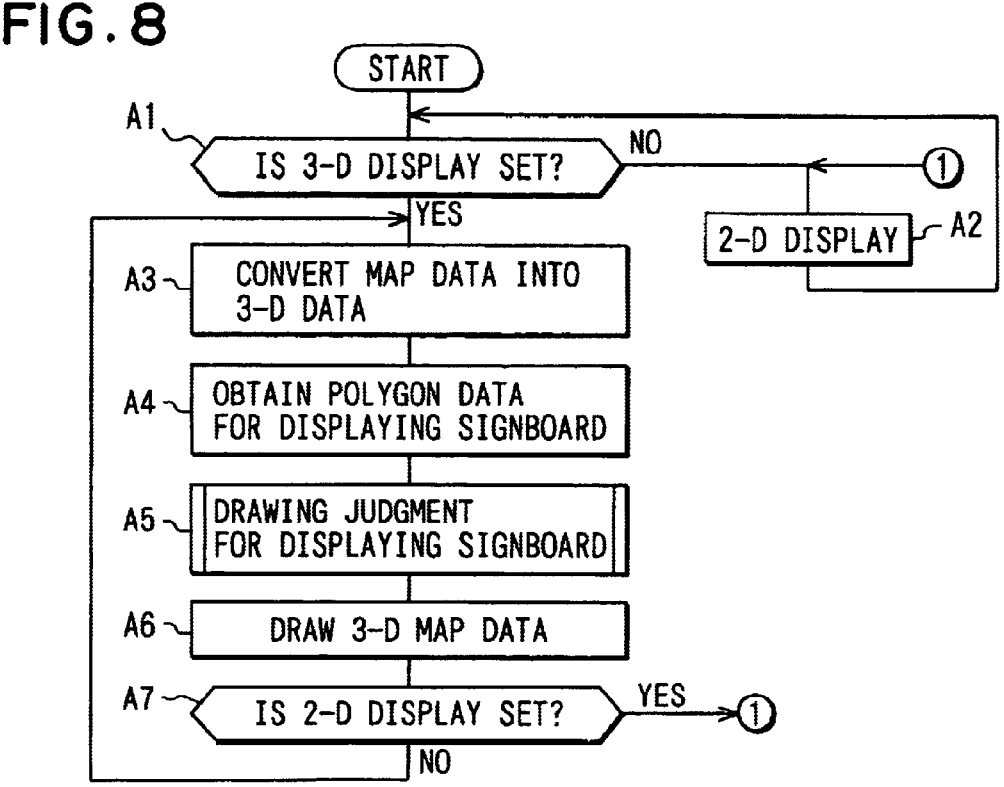
FIG. 8 is a flowchart illustrating a process of displaying traffic regulation information of a fifth embodiment.

FIG. 8 is a flowchart illustrating the content of control operation of when the control unit 119 displays traffic regulations information on the screen of the display unit 116 together with the map. The control unit 119 first judges (step A1) whether the three-dimensional display (3D display) has been set by the user, renders the judgment "NO" when it has not been set, and displays, on a plane (2D display), the map data fetched by the map data fetching unit 120 from the map data storage unit 113.

When the three-dimensional display has been set at step A1, the control unit 119 renders the judgment "YES" and converts the map data fetched by the map data fetching unit 120 into data of three-dimensional display (step A3). In this case, the three-dimensional display is so converted as to comply with the presently set altitude of viewing point (e.g., scale of display of the map) and the direction in which the road is seen.

Then, the control unit 119 obtains, through the map data fetching unit 120, a polygon for displaying traffic regulations information contained in the map data (step A4) on a signboard and judges whether the polygon be drawn on the signboard (step A5). The signboard display stands for a three-dimensional display of a design of traffic regulations information (display of a design that changes depending on the viewing point) at a predetermined height above ground on the map as shown, for example, in FIG. 14.

Based on the judged result at step A5, the control unit 119 three-dimensionally displays the map data on the screen of the display unit 116 (step A6) through the drawing unit 124. The control unit 119 judges whether there is a conversion into the two-dimensional display by the user. When there is a conversion, the routine proceeds to step A2 and, when there is no conversion, the routine proceeds to step A3.

Figure 9:
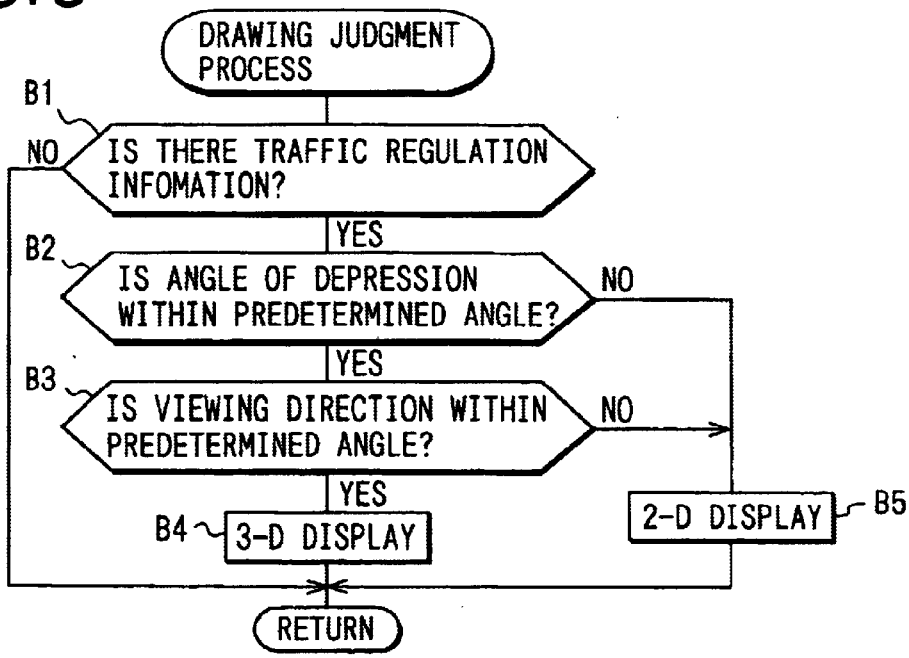
FIG. 9 is a flowchart illustrating a drawing judgment process.
Figure 10:
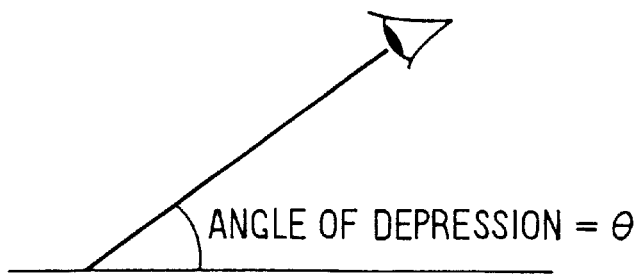
FIG. 10 is a diagram illustrating an angle of depression from a viewing point.
Figure 11:
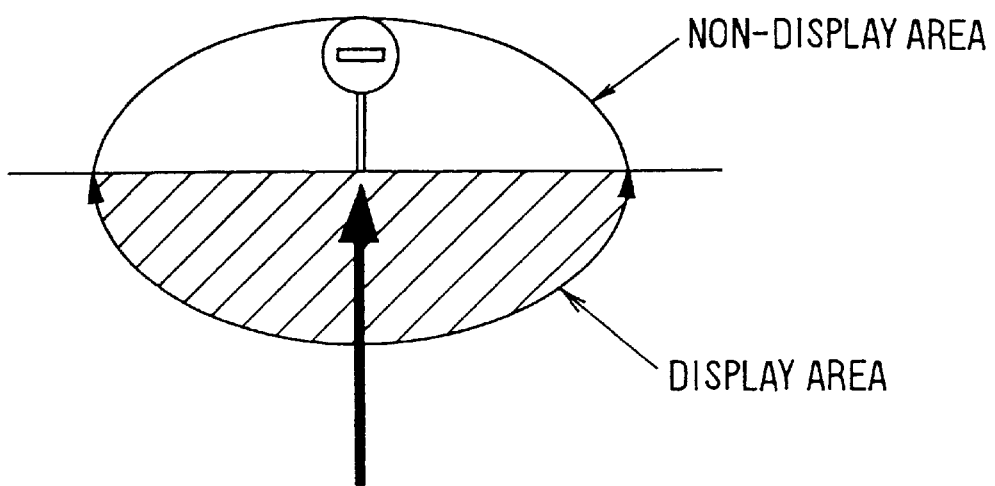
FIG. 11 is a diagram illustrating a viewing direction with respect to a normal direction of a traffic signpost.

FIG. 9 is a flowchart illustrating the content of the control operation for judging the drawing at step A5. In FIG. 9, the control unit 119 judges whether the traffic regulations information has been included in the map data that are to be drawn (step B1). When the information has been included, the control unit judges whether the angle of depression (see FIG. 10) set as a viewing point of the present three-dimensional display lies within a predetermined angle (e.g., 50 degrees), or judges whether the angle by which the traffic regulation information is displayed being inclined relative to the viewing direction with the viewing point as a reference (see FIG. 11) is within a predetermined angle (e.g., 80 degrees) (steps B2, B3). For easy explanation, FIG. 10 shows an angle subtended by the viewing direction with the front surface of display as a reference, which, however, is a relative expression and is substantially the same.

When the control unit 119 renders the judgment "NO" at either step B2 or step B3, the traffic regulations information is two-dimensionally displayed (step B5). When the control unit 119 renders the judgment "YES" at both steps B2 and B3, the traffic regulations information is three-dimensionally displayed (display of signpost) (step B4).

Figure 12A:
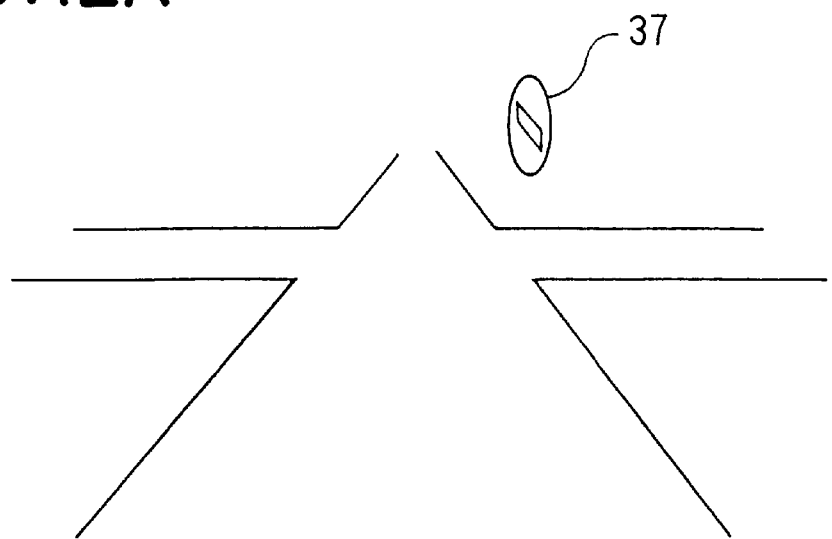
FIG. 12A is an example of screen in which the angle of depression is relatively small.
Figure 12B:
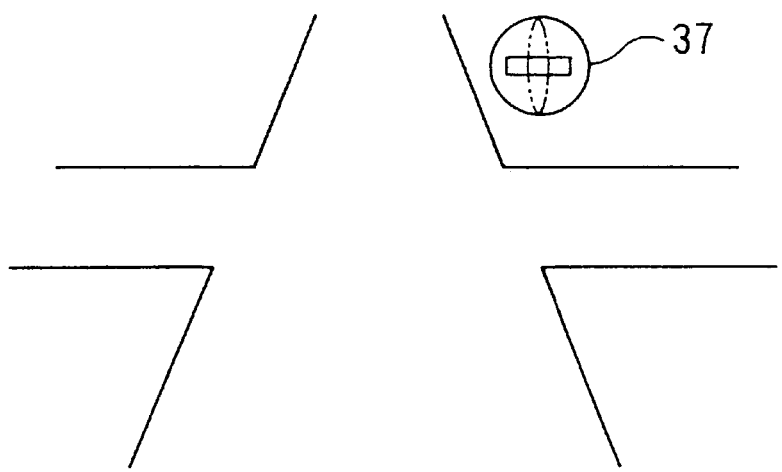
FIG. 12B is an example of screen in which the angle of depression is relatively large with respect to FIG. 12A.

That is, referring, for example, to FIGS. 12A and 12B, there is a road that turns to the right ahead of the road on which the user is proceeding, and there is a signpost of no entrance (traffic regulations information) 37 (the post is not shown unlike those of FIG. 14). In this case, when the viewing point is relatively low (see FIG. 12A), the user can see the sign 37 even when it is a signboard. When the viewing point becomes relatively high as shown in FIG. 12B, however, the sign 37 of the signboard becomes a very narrow ellipse as indicated by a broken line in the drawing and becomes very difficult to be recognized by the user. In the case of FIG. 12B, therefore, it becomes easier for the user to recognize the sign 37 when a two-dimensional display design is displayed.

According to the fifth embodiment as described above, a design representing the signpost 37 is three-dimensionally displayed by using a polygon at a predetermined height above ground on a map on the screen of the display unit 116, and the display quality becomes better than a design drawn by using the bit map data of the related art. Thus, the user is enabled to more easily watch the signpost and, hence, to drive more safely. Besides, since the design is displayed in a form that can be viewed in match with the position of viewing the display on the screen, the signpost 37 can be three-dimensionally displayed without compromising visual aesthetics of the display, and the user may more easily view the signpost irrespective of the viewing point that is set.

According to the fifth embodiment, further, when the angle of depression from the viewing point exceeds a predetermined angle or when the angle of direction in which the signpost 37 is seen exceeds a predetermined angle, the design representing the signpost 37 is changed from the three-dimensional display over to the two-dimensional display. Even when the angle of depression or the angle of the viewing direction becomes relatively great, therefore, it can be clearly indicated from which point of the road the signpost 37 can be effectively seen or the signpost 37 itself can be clearly shown.

Sixth Embodiment

Next, a sixth embodiment of the invention will be described with also reference to FIGS. 15A, 15B, 16A and 16B. In the sixth embodiment, the control unit 119 displays the signpost 37 of no entrance on the map displayed on the screen of the display unit 116 and, further, two-dimensionally displays a design ("X" and arrow) 38 meaning no entrance. FIGS. 16A and 16B also illustrate an example of a signpost 39 representing a speed limit of 40 kph and design ("40" and an arrow) 40 having the same meaning.

With the design meaning traffic regulations information being displayed in both the two-dimensional manner and the three-dimensional manner on the screen of the display unit 116, information can be compensated by the two-dimensionally displayed design even when the three-dimensionally displayed sign post becomes less recognizable due to a change in the angle of depression of viewing position or in the viewing direction. Unlike the fifth embodiment, there is no need of judging whether the three-dimensional display or the two-dimensional display be selected, and the control unit 119 needs bear a decreased burden.

Other Embodiments

The invention is in no way limited to the first to sixth embodiments described above, but may be modified or expanded as described below.

The route guidance line 128 may be drawn as a rectangular parallelopiped or a cube. Or, a three-dimensional arrow may be attached to an end of the three-dimensional route guidance line 128.

The lane guidance line indicating the road that turns to the right, left or goes straight, may also be three-dimensionally displayed like the above route guidance line 128.

In the second embodiment, the route guidance line 128 may not be drawn on the portion where the route guidance line 128 and the building 130 are overlapping one upon the other. The route guidance line 128 may not similarly be drawn when it passes on the lower road of the multi-level crossing or when it passes through a tunnel.

In the fourth embodiment, the facility may be drawn as a rectangular parallelopiped, a cylinder or a cube close to its real shape. Further, the signal may be three-dimensionally displayed.

In the fifth and sixth embodiments, traffic regulations information three-dimensionally displayed needs not be limited to a signpost but may be such information as "Traffic Closed due to Accident", "Jamming 10 km", "Speed Limit of 60 km due to Rain" obtained from the VICS or the like.

The angle of depression of the viewing point or the angle of the seeing direction may be suitably changed to change the signboard display over to the plane display.

Figure 15A:
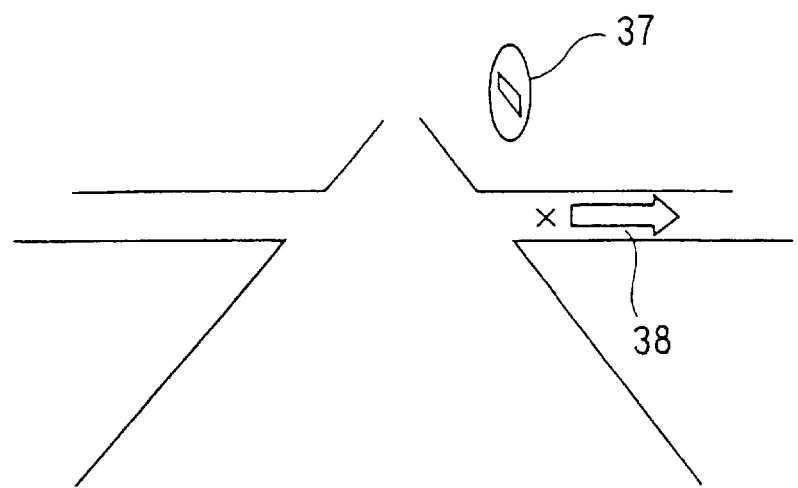
FIG. 15A is an example of screen in which the angle of depression is relatively small of a sixth embodiment.
Figure 15B:
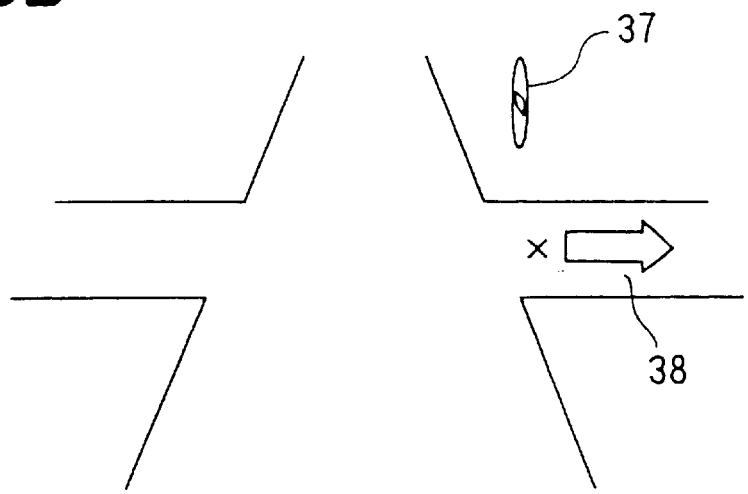
FIG. 15B is an example of screen in which the angle of depression is relatively large with respect to FIG. 15A.
Figure 16A:
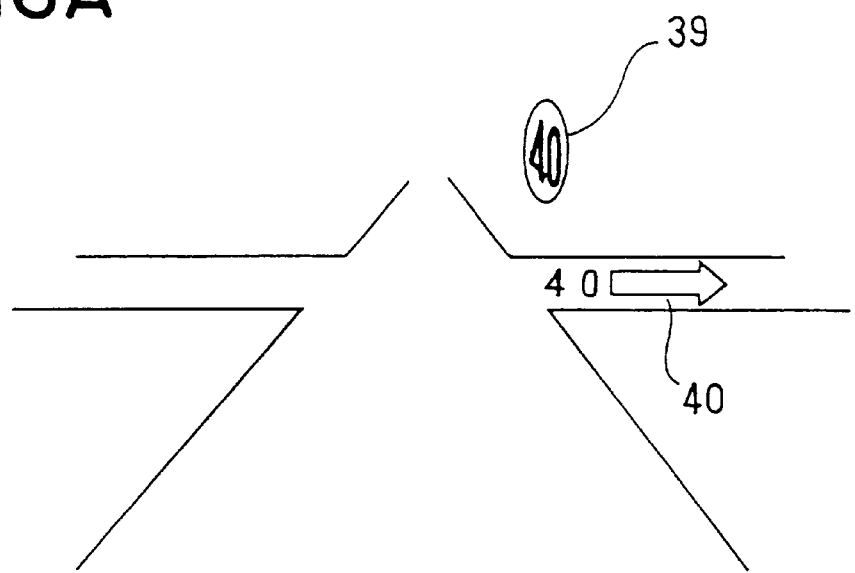
FIG. 16A is an example of screen in which the angle of depression is relatively small of the sixth embodiment.
Figure 16B:
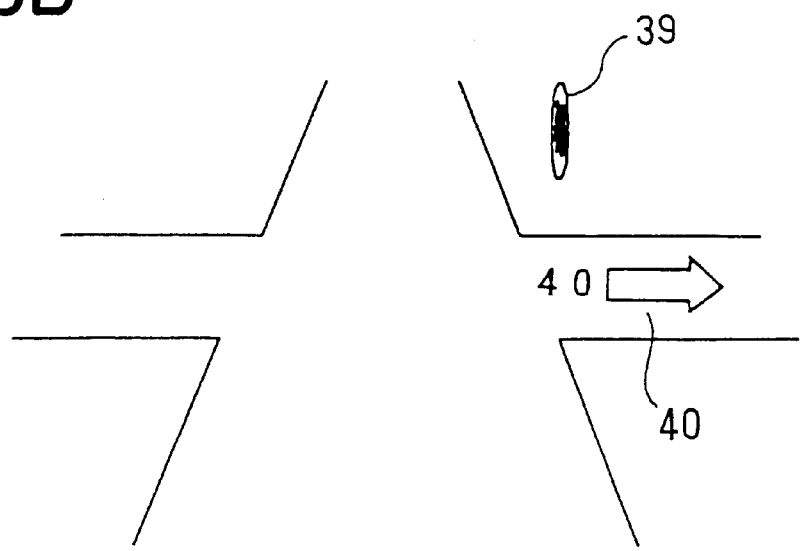
FIG. 16B is an example of screen in which the angle of depression is relatively large with respect to FIG. 16A.

In the sixth embodiment, for example, the sign of "No Entrance" may be displayed as the signboard, and the plane design may be an arrow of a direction opposite to that of FIGS. 15A and 15B to represent "One-Way".

Seventh Embodiment

A seventh embodiment in which the map display device of the invention is applied to a vehicular navigation device will now be described with reference to FIGS. 17 to 19.

Figure 17:
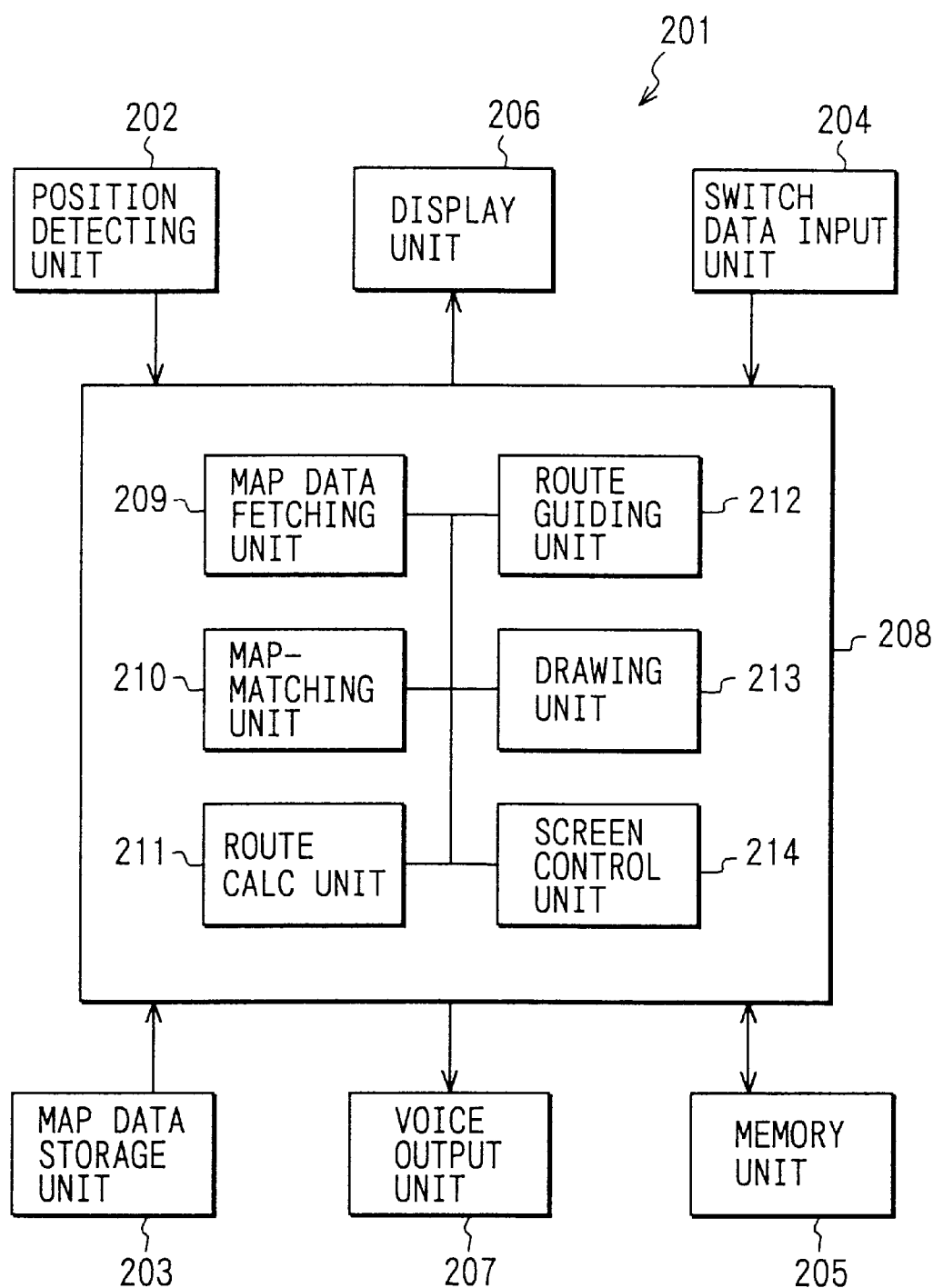
FIG. 17 is a schematic block diagram illustrating a vehicular navigation system of a seventh embodiment.
Figure 18:
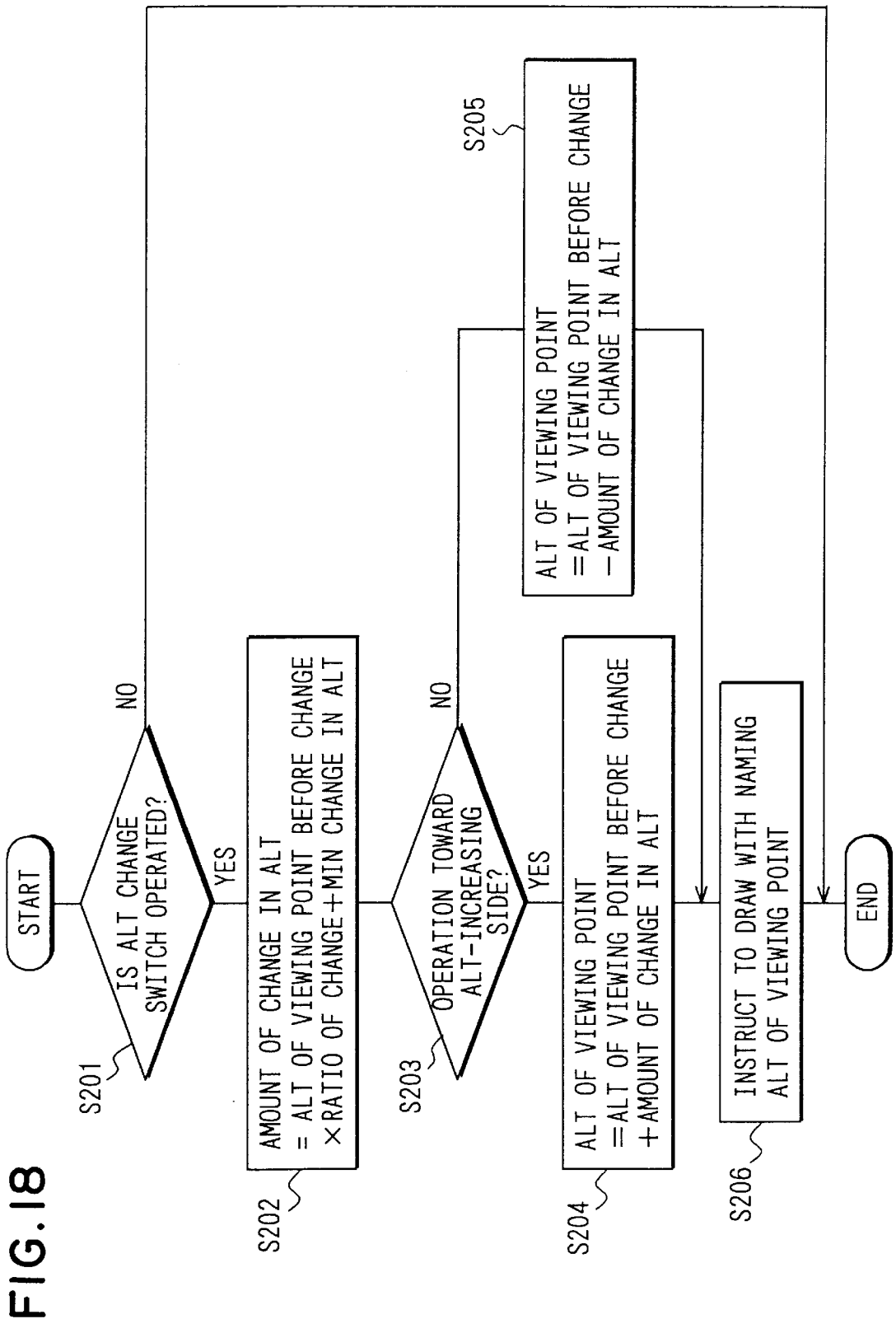
FIG. 18 is a flowchart illustrating a process of setting an altitude of the viewing point.

FIG. 17 is a schematic functional block diagram illustrating the whole constitution of a vehicular navigation device 201. In FIG. 17, a position detecting unit 202 is constituted by a GPS (global positioning system) receiver, a gyrosensor and a vehicle speed sensor, and calculates the present position of the vehicle. In the position detecting unit 202, the sensors include errors of different natures. Therefore, the position detecting unit 202 is so constituted as can be used while correcting the errors. If the present position can be calculated, these sensors need not be all provided but any one or more of these sensors may be provided.

A map data storage unit 203 is for inputting various data including so-called map-matching data, map data and object data for improving the precision for detecting the position, and is constituted by a DVD player, a hard disk device, a CD player and the like.

A switch data input unit 204 (corresponds to input means of the invention) includes switches arranged on the right, left, upper and lower sides of a display device that will be described later, e.g., an altitude change switch for increasing or decreasing the altitude of viewing point, and a viewing direction change switch for changing the viewing direction upward or downward. When the switch for changing the altitude of viewing point and the switch for changing the viewing direction are operated by a single shot, an altitude change instruction of viewing point and a viewing direction change instruction are output for changing the altitude of viewing point and for changing the viewing direction by one step only. When these switches are continuously operated, the altitude change instruction and the viewing direction change instruction are consecutively output maintaining a predetermined time interval.

A memory unit 205 is constituted by, for example, a ROM or a RAM, the ROM storing an execution program for operating the vehicular navigation device 201, and the RAM temporarily storing temporary data when the program is being executed as well as map data obtained from the map data storage unit.

A display unit 206 is for displaying a map and a screen for selecting the destination, and is constituted by, for example, a liquid crystal display device. On the screen are displayed a mark representing the present position of the vehicle input from the position detecting unit 202, map data input from the map data storage unit 203, and additional data such as a route guidance line superposed on the map and a mark representing a point of setting a target.

A voice output unit 207 outputs voice for guide and explanation for operation on the screen.

A control unit 208 is constituted by chiefly a microcomputer, and executes a route guide function for displaying the route guidance line by automatically selecting an optimum route from the present position to the destination, and executes the map-matching processing, synthesis of guide voice and drawing of a map corresponding to the altitude of viewing point and viewing direction that have been set, depending upon the operation using the switch data input unit 204.

The control unit 208 is constituted by a map data fetching unit 209, a map-matching unit 210, a route calculation unit 211, a route guiding unit 212, a drawing unit 213, a screen control unit 214, and the like.

The map-matching unit 210 specifies on which road the present position of the vehicle is existing by using position data of the vehicle detected by the position detecting unit 202 and road shape data of map data obtained from the map data storage unit 203. Here, the map data required by the map data fetching unit 209 are obtained from the map data storage unit 203. Further, the user operates the switch data input unit 204 to display a desired map thereby to set a destination. The route calculation unit 211 calculates the data related to the present position calculated by the map-matching unit 210, a start point specified by the user and an optimum route to the destination.

The route guiding unit 212 calculates points necessary for the route guide as well as a necessary route guide (whether to turn to the right or to the left) from the results of the above route calculation and the shape data of roads, position data of an intersection and position data of railroad crossing stored in the map data.

The drawing unit 213 draws a map of the present position, a rough sketch of expressways, enlarged map near the intersection, etc. according to the instruction from the screen control unit 214, and displays them on the display unit 206.

The screen control unit 214 (corresponds to screen control means of the invention) sets the altitude of viewing point based on an instruction for changing the altitude of viewing point input from the altitude changes witch. The screen control unit 214 further sets the viewing direction independently of the altitude of viewing point based upon an instruction for changing the viewing direction input from the viewing direction change switch.

The map data fetching unit 209 fetches map data needed by the above processing units from the map data storage unit 203, and sends them to the processing units. The above processing is executed by the ROM and RAM in the memory unit 205.

The map drawn by the drawing unit 213 is a three-dimensional map (for example, a bird's-eye view or a three-dimensional map), and the buildings and the multi-level crossing are drawn in a three-dimensional manner based on the shape data of buildings, height data of buildings, shape data of roads, and the preset altitude of viewing point and viewing direction stored in the map data. As the vehicle proceeds based on the data calculated by the route guiding unit 212 and arrives at a position at where the route is to be guided, a desired picture is drawn on the drawing unit 213 or predetermined voice is sounded by the voice output unit 207 to guide the user to the destination.

The action of the above constitution will now be described with reference to FIGS. 18 and 19.

The user operates the altitude change switch to change the altitude of viewing point at the time of three-dimensionally displaying a map on the display unit 206. FIG. 18 is a flowchart of a process for setting the altitude of viewing point by using the screen control unit 214. In FIG. 18, the screen control unit 214 judges whether the altitude change switch is operated (step S201), and ends the process for setting the altitude of viewing point when it has not been operated (NO). When the altitude change switch is operated to give an instruction for changing the altitude of viewing point (YES), the screen control unit 214 sets the altitude of viewing point in a manner as described below.

That is, based on the altitude of viewing point that has been set before being changed (before the altitude change switch is operated), the screen control unit 214 calculates the amount of change in the altitude of viewing point that increases or decreases by a single-shot operation of the altitude change switch according to the following formula (1) (step S202), AMOUNT OF CHANGE IN THE ALTITUDE=ALTITUDE OF VIEWING POINT OF BEFORE CHANGED×RATIO OF CHANGE+MINIMUM CHANGE IN THE ALTITUDE   (1)

In this formula (1), the term (altitude of viewing point of before changed×ratio of change) corresponds to the proportionally changing altitude of the invention, and the minimum change in the altitude corresponds to the constantly changing altitude of the invention. The screen control unit 214 judges whether the altitude change switch is operated toward the "altitude-increasing side" or the "altitude-decreasing side" (step S203). When the switch is operated to ward the "altitude-increasing side" (YES), the screen control unit 214 sets the altitude of viewing point in compliance with a formula (2) (step S204) and when the switch is operated toward the "altitude-decreasing side" (NO), the screen control unit 214 sets the altitude of viewing point according to a formula (3)(step S205), ALTITUDE OF VIEWING POINT=ALTITUDE OF VIEWING POINT OF BEFORE CHANGED+AMOUNT OF CHANGING THE ALTITUDE   (2), ALTITUDE OF VIEWING POINT=ALTITUDE OF VIEWING POINT OF BEFORE CHANGED−AMOUNT OF CHANGING THE ALTITUDE   (3)

The screen control unit 214 outputs the altitude of viewing point found from the above formulas (1) to (3) to the drawing unit 213, instructs the display unit 206 to draw the three-dimensional map as viewed from the viewing point of the above altitude (step S206), and ends the processing for setting the altitude of viewing point.

Figure 19:
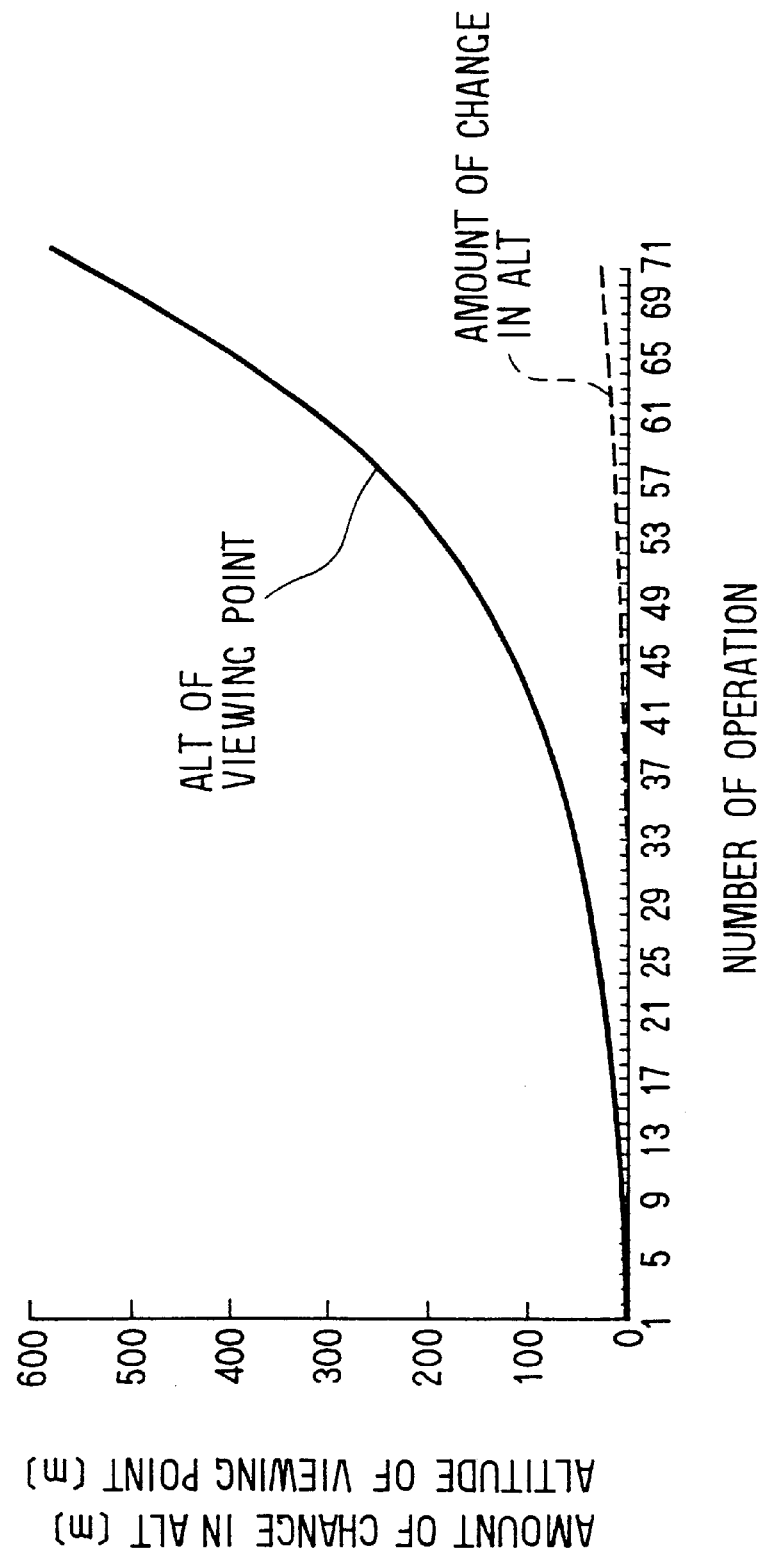
FIG. 19 is a diagram illustrating relationships between the number of times of operations of an altitude change switch and the altitude of the viewing point, and between the number of times of operations of an altitude change switch and amount of change in the altitude.

FIG. 19 illustrates a relationship between the number of times of operating the altitude change switch toward the "altitude-increasing side" and the altitude of viewing point that is set, and a relationship between the number of times of operation and the amount of change in the altitude, by a solid line and a broken line, respectively. Here, the ratio of change is set to $\frac{1}{16}$, a minimum change in the altitude is set to 0.5 m, and the initial altitude of viewing point is set to 0 m.

As shown in FIG. 19, the altitude of viewing point exponentially increases as a whole relative to the number of times of operating the altitude change switch, and the initial altitude of viewing point changes from 0 m to nearly an altitude of viewing point of about 600 m through the operation for raising the altitude of 71 times. As the altitude of viewing point increases, the proportionally changing altitude (altitude of viewing point of before changed×ratio of change) of the formula (1) increases, and the amount of change in the altitude by the operation of the altitude change switch increases, too. When the altitude of viewing point is low, the proportionally changing altitude is small but the minimum change in the altitude (constantly changing altitude) of the formula (1) is added. Therefore, the altitude of viewing point is increased by at least 0.5 m by operating the altitude change switch. When the altitude change switch is continuously operated, the altitude of viewing point is raised step by step after every predetermined time interval according to the curve show in FIG. 19 so far as the operation is continued.

According to this embodiment as described above, the screen control unit 214 calculates the amount of change in the altitude when the altitude change switch is operated. This is done by obtaining a proportionally changing altitude by multiplying the present altitude of viewing point by a ratio of change and the minimum change in the altitude, i.e., the constantly changing altitude together. The screen control unit then adds or subtracts the amount of change in the altitude to, or from, the present altitude of viewing point to newly set an altitude of viewing point, enabling the user to set a number of altitudes of viewing point (72 steps in this embodiment).

In this case, the amount of change in the altitude increases with an increase in the altitude of viewing point. Even when the viewing point is to be changed from a low altitude to a high altitude, therefore, the user is allowed to set the viewing point maintaining favorable operability. At a relatively high altitude of viewing point, further, the altitude changes nearly at a constant rate with respect to the present altitude of viewing point. Upon operating the altitude change switch, therefore, the user obtains a feeling of ascending viewing point or a feeling of descending viewing point in the three-dimensional display of map. By continuously operating the altitude change switch, the user is allowed to continuously and smoothly change the three-dimensionally displayed map.

At a relatively low altitude of viewing point, on the other hand, the constantly changing altitude becomes dominant in the amount of changing the altitude rather than the proportionally changing altitude. By operating the altitude change switch, therefore, the user is allowed to change the altitude of viewing point by at least a minimum amount of change to obtain a feeling of ascending viewing point or descending viewing point in the three-dimensional display of map. Like in the case of a high altitude of viewing point, further, it is allowed to smoothly change the three-dimensional display of map.

Upon operating the altitude change switch, further, the user can set the viewing direction toward the upper direction or the lower direction independently of setting the altitude of viewing point. Upon setting the viewing point to a high altitude and the viewing direction to be slightly lower than the horizontal plane, therefore, it is allowed to display the whole row of stores and houses on a street or to display a distant view over the three-dimensionally displayed high-rising buildings. Upon setting the viewing direction to the upper direction, further, the user can display a state in which he looks up the buildings and elevated roads from the present viewing position. Upon setting the viewing direction as described above, the user can obtain much information from the three-dimensionally displayed map.

Eighth Embodiment

Figure 20:
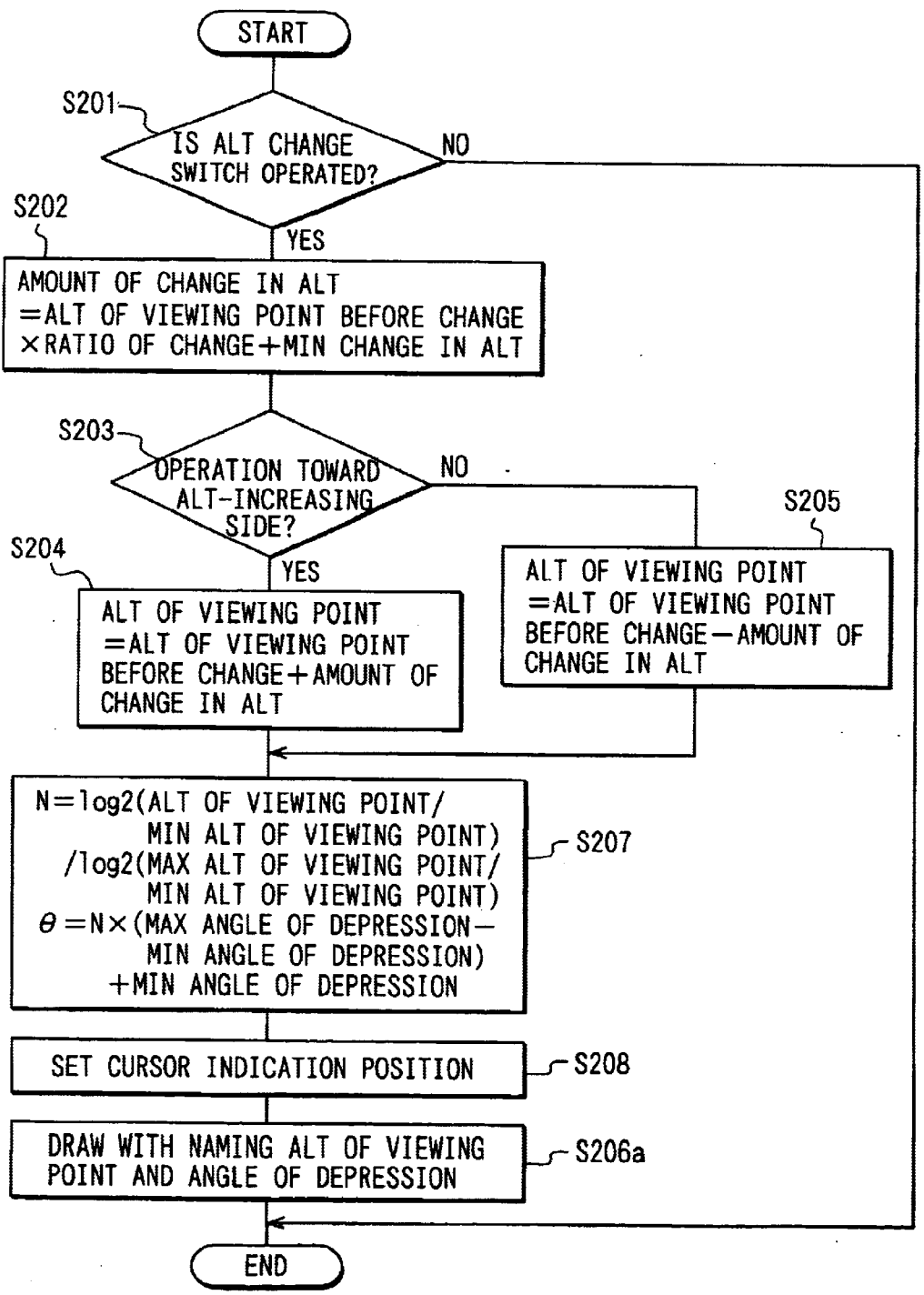
FIG. 20 is a flowchart illustrating a process of setting an altitude of the viewing point of an eighth embodiment.
Figure 21:
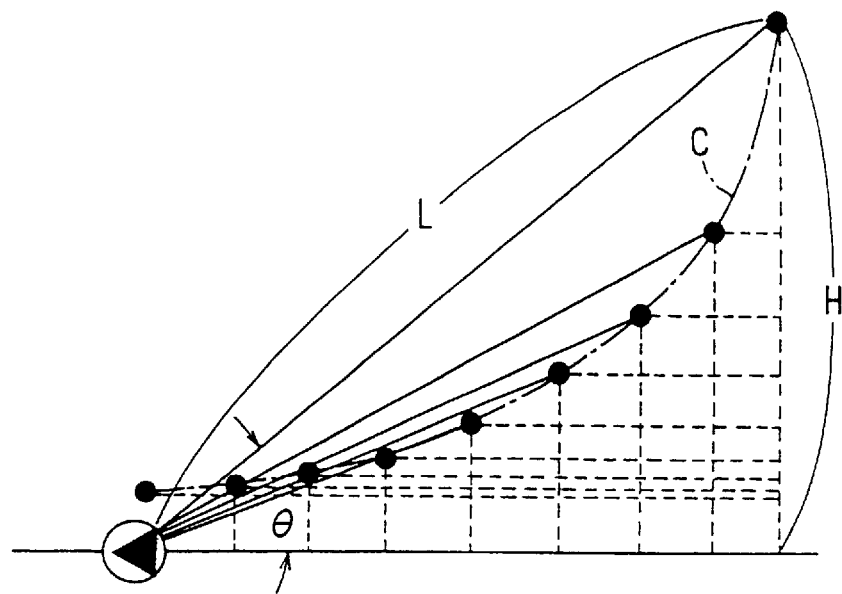
FIG. 21 is a diagram illustrating changes of the viewing point in a 3-D display, seen from a side.

FIGS. 20 to 22 illustrate an eighth embodiment of the invention, and wherein the same portions as those of the seventh embodiment are denoted by the same reference numerals but are not described, and different portions only are described. FIG. 20 is a flowchart illustrating a processing for setting the altitude of viewing point using the screen control unit 214, and wherein processing steps S207 and S208 are inserted between steps S204, S205 and step S206.

At step S207, the screen control unit 214 changes the altitude of viewing point set at step S204 or S205, i.e., changes the angle of depression in the viewing direction depending upon the scale of the map. First, the ratio of change N (0<N<1) in the angle of depression θ is set according to the formula (4), N=log 2 (ALTITUDE OF VIEWING POINT/MINIMUM ALTITUDE OF VIEWING POINT)/log 2 (MAXIMUM ALTITUDE OF VIEWING POINT/MINIMUM ALTITUDE OF VIEWING POINT) (4)

Here, the minimum altitude of viewing point and the maximum altitude of viewing point are set to be, for example, 0 m and 600 m like in the seventh embodiment. A logarithmic function is employed, so that the ratio of change in the angle of depression θ increases with an increase in the area of the map that is displayed accompanying an increase in the altitude of viewing point and that the ratio of change in the angle of depression θ decreases as the map is displayed in detail accompanying a decrease in the altitude of viewing point like in the first embodiment. The formula (4) determines a curve of locus C of change in the viewing point shown in FIG. 21.

When the ratio of change N is determined, the angle of depression θ is determined according to the formula (5), θ=N×(MAXIMUM ANGLE OF DEPRESSION−MINIMUM ANGLE OF DEPRESSION)+MINIMUM ANGLE OF DEPRESSION (5)

where the maximum angle of depression is set to be, for example, 90 degrees and the minimum angle of depression is set to be, for example, 15 degrees.

Here, as shown in FIG. 21, when the altitude of viewing point is H, the viewing distance L from the viewing point up to the present position (particular point) indicated by a cursor on the three-dimensionally displayed map is given by, $L=H\cdot\text{cosec }\theta$ (6)

When the map is displayed in a two-dimensional manner on the same scale, θ=90 degrees and, hence, L=H.

Further, a mark representing the present position shown in FIG. 21 is different from the display of when it is seen from the viewing point of FIG. 21 due to the positional relationship between the present position and the viewing point of FIG. 21.

At subsequent step S208, the screen control unit 214 sets the cursor indication position Pc for indicating the present position on the map by using the ratio of change N of the angle of depression θ, as follows:

Pc=(Y-COORDINATE OF CENTRAL POSITION OF THE SCREEN)×N

When the cursor indication position Pc is thus set, the present position can be suitably displayed on the map even when the angle of depression has changed depending upon the altitude of viewing point.

Figure 22A:
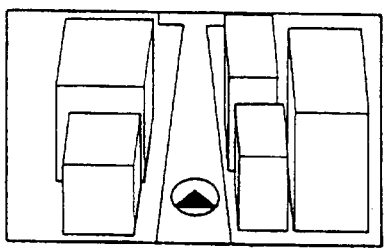
FIGS. 22A to 22D are examples of the screen on which a map is three-dimensionally drawn and is respectively seen from the viewing point A–D shown in FIG. 22E.
Figure 22B:
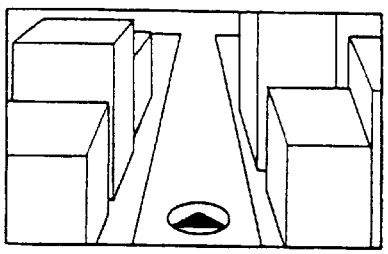
Figure 22C:
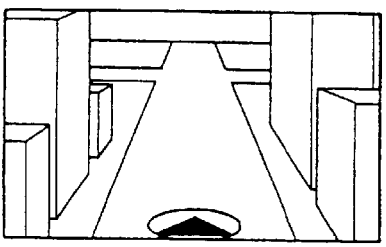
Figure 22D:
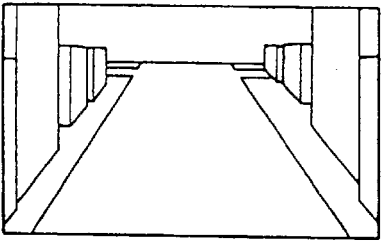
Figure 22E:
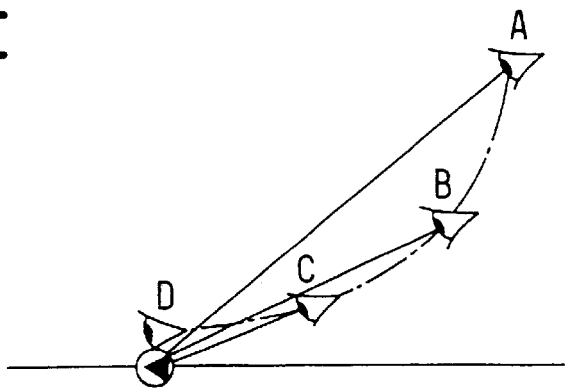
FIG. 22E is a diagram illustrating changes of the viewing point in a 3-D display, seen from a side.

FIGS. 22A to 22D illustrate a change in the display on the screen of the display unit 6 drawn at step S206a based on the angle of depression θ determined as described above, and are displays corresponding to viewing positions A to D shown in FIG. 22E. As will be obvious from these FIGS. 22A to 22D, the angle of depression θ decreases with a decrease in the scale of the map; i.e., the map is widely displayed toward a distance in the direction of progress.

The cursor indicating position that represents the present position of the car gradually moves toward the lower side of the screen depending upon a change in the viewing point. FIG. 22D is a driver's view in which the present position is nearly in agreement with the viewing point as represented by the viewing point D, and the cursor is not indicated on the screen of the display unit 206. In this case, though no cursor is indicated on the screen, the position of the car can be grasped to a sufficient degree from the shapes of the surrounding buildings and the shape of the road in the direction of progress.

Figure 23A:
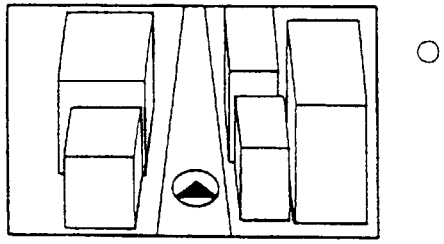
FIGS. 23A to 23D are examples of the screen on which a map is three-dimensionally drawn and is respectively seen from the viewing point A–D shown in FIG. 23E.
Figure 23B:
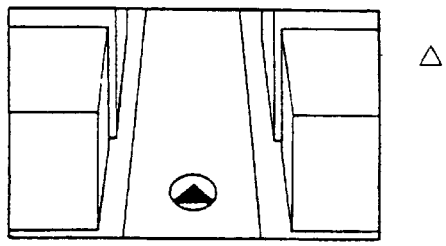
Figure 23C:
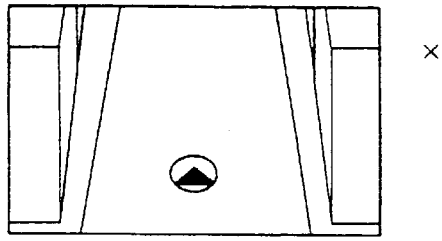
Figure 23D:
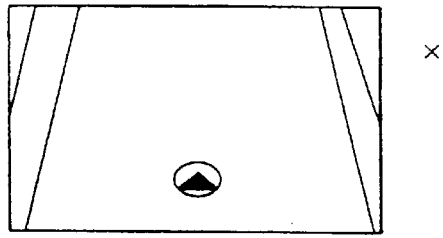
Figure 23E:
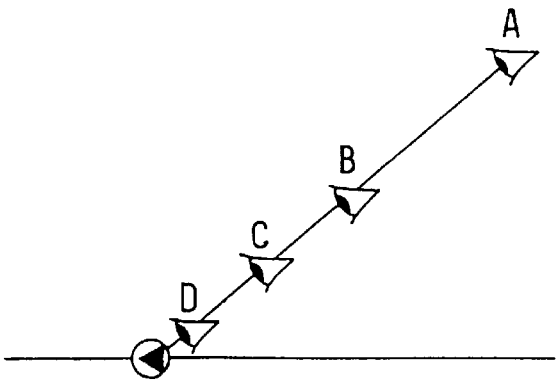
FIG. 23E is a diagram illustrating changes of the viewing point in a 3-D display, seen from a side according to a related art.

FIGS. 23A to 23D and 24A to 24D illustrate examples of display on the screen based on the related art for the purpose of comparison. FIGS. 23A to 23D are those of the system in which the angle of depression of the viewing direction in the three-dimensional display remains constant as shown in FIG. 23E, and the viewing point approaches the present position which is at the end of the viewing line as the altitude of viewing point decreases (as the scale increases). In this case, there is no problem at the viewing point A shown in FIG. 23A like in FIG. 22A. As the altitude of viewing point decreases from the viewing point B toward the viewing point D, however, the display region becomes gradually narrow in the direction of progress, and the surrounding buildings gradually disappears. In FIG. 23D, the direction of progress and the surrounding buildings are not almost displayed, but the road only is displayed on an enlarged scale, and the driver finds it difficult to grasp the present position of the vehicle.

Figure 24A:
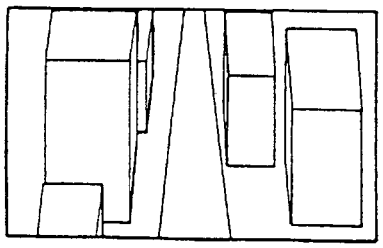
FIGS. 24A to 24D are examples of the screen on which a map is three-dimensionally drawn and is respectively seen from the viewing point A–D shown in FIG. 24E.
Figure 24B:
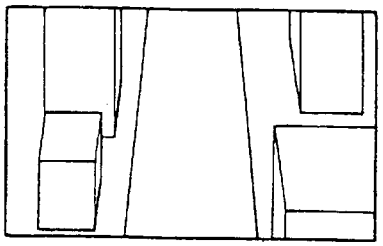
Figure 24C:
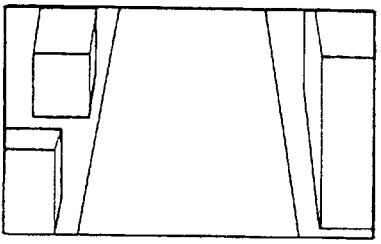
Figure 24D:
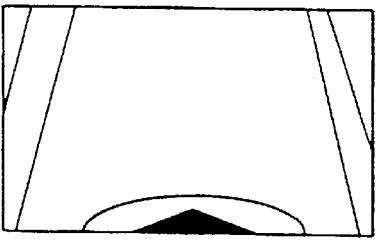
Figure 24E:
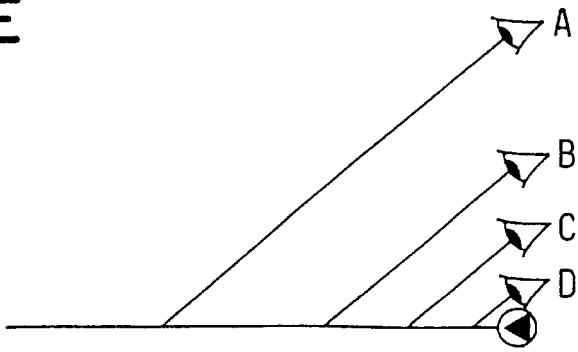
FIG. 24E is a diagram illustrating changes of the viewing point in a 3-D display, seen from a side according to another related art.

FIGS. 24A to 24D are those of the system in which the angle of depression of the viewing direction in the three-dimensional display remains constant like in the case of FIGS. 23A to 23D, the viewing point is just over the present position at all times as shown in FIG. 24E and the viewing point descends perpendicularly as the altitude of viewing point decreases. At a viewing point A shown in FIG. 24A, in this case, the display region is considerably separated from the position of the car, from which it is difficult to grasp the relationship to the present position of the car. As the altitude of viewing point decreases from this state down to viewing points B to D, the positions gradually approach between the displayed map and the present car, from which, however, it is still difficult to grasp the positional relationship. In FIG. 24D like in FIG. 23D, the direction of progress and the surrounding buildings are barely visible, as the road is displayed on an enlarged scale.

On the other hand, FIGS. 22A to 22E display the region near the present position of the car and the distant region in the direction of progress from the present position maintaining good balance either when the altitude of viewing point is high or low.

According to the eighth embodiment as described above, the screen control unit 214 sets the ratio of change N in the angle of depression θ relying upon the altitude of viewing point in compliance with the formula (4), and sets the angle of depression θ in compliance with the formula (5), so that when the altitude of viewing point is set to be low, the angle of depression θ is set to a small value and the width of change thereof is set to be relatively small and that when the altitude of viewing point is set to be relatively high, the angle of depression θ is set to a large value and the width of change thereof is set to be relatively large.

Therefore, either when the altitude of viewing point is high or low, the region near the present position of the car and the distant region in the direction of progress from the present position are displayed maintaining good balance on the screen of the display unit 206. Accordingly, the user can easily grasp the whole perspective feeling from the viewing point and can obtain a feeling of smooth change in the display of map accompanying a change in the altitude of viewing point.

Further, since a particular point on the map at an end in the viewing direction is the present position of the car, the picture is drawn looking down the present position of the car even in a state where the map displayed on the screen changes every moment like in the use as a vehicular navigation device, and the user can easily grasp the present position of the car in the map displayed on the screen.

Further, the screen control unit 214 sets the cursor indication position on the screen by (X, N·Y) for the center coordinate (X, Y) displayed on the screen based on the ratio of change N in the angle of depression θ.

That is, the cursor has heretofore been indicated at a fixed position, such as at a position of 3:1 from the upper side on the Y-coordinate of the screen. Therefore, when, for example, the angle of depression is very small like in FIG. 22D, the road and the surrounding buildings at a position which the car has already passed are displayed on the closer side on the screen. According to the eighth embodiment, on the other hand, the present position on the screen can be suitably displayed even at a viewing point close to the driver's view.

This invention is not limited to the above embodiments only but can be modified or expanded as described below.

When the altitude of viewing point that is now set is lower than a predetermined altitude, the screen control unit 214 may be so constituted as to use the amount of change in the altitude every time when the altitude change switch is operated as the constantly changing altitude (minimum change in the altitude). When the altitude of viewing point that is now set is higher than the predetermined altitude, the screen control unit 214 may be so constituted as to use the proportionally changing altitude obtained by multiplying the present altitude of viewing point by the ratio of change as the amount of change in the altitude. In this case, too, the effects same as those of the above embodiments are obtained.

The screen control unit 214 may set the viewing direction toward the upper direction or the lower direction in relation to setting the altitude of viewing point. As a result, it becomes possible to automatically trap a predetermined object or objective place on the display screen irrespective of the altitude of viewing point that is set.

A particular point at an end in the viewing direction on the map indicated by the cursor may be set beyond the present position without being limited to the present position of the car.

The ratio of change N in the angle of depression θ needs not be limited to the one represented by the formula (4). For example, the ratio of change N may be determined by the following formula, so that the angle of depression changes linearly with respect to a change in the altitude of viewing point.

N=(ALTITUDE OF VIEWING POINT)/(MAXIMUM ALTITUDE OF VIEWING POINT)

The device is not limited to the navigation device for cars but can be applied to any device provided it displays a map in a three-dimensional manner.

Ninth Embodiment

A ninth embodiment in which the invention is applied to a navigation device for cars will be described with reference to FIGS. 25A to 28.

Figure 28:
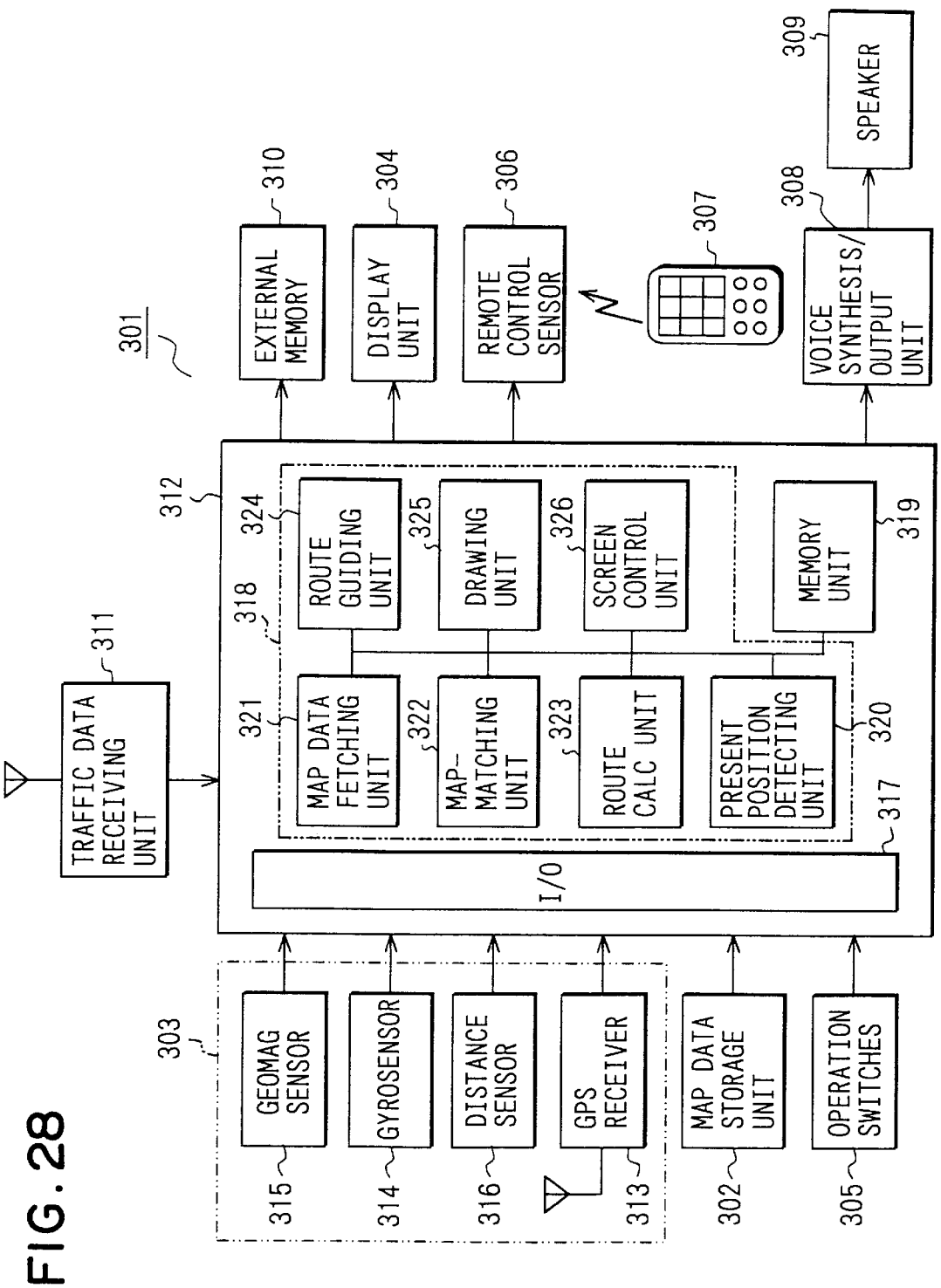
FIG. 28 is a schematic block diagram illustrating a vehicular navigation system of the ninth embodiment.

Referring to FIG. 28, the navigation device 301 for cars includes a map data storage unit 302 as map data storage means, a position detecting unit 303 as present position detecting means and progressing direction detecting means, a display unit 304 as display means, a group of switches 305 as operation means, a remote control sensor 306, a remote control unit 307 which constitutes a pair with the remote control sensor 306, a voice synthesis/output unit 308 and a speaker 309 as voice-sounding means for producing operation procedure and route guide by voice, an external memory 310 such as hard disk, a VICS transmitter/receiver 311, and a control unit 312 as control means.

The map data storage unit 302 is constituted by a DVD-ROM as a storage medium, a hard disk, a large-capacity storage medium such as CD-ROM, and a reproduction unit for reproducing data stored in the storage medium. The storage medium stores road map data as well as three-dimensional digital road map data base inclusive of data for three-dimensionally displaying various buildings (such as government offices, banks, schools, stations, airport, hotels, buildings, various facilities, etc.). The storage medium further stores text information for displaying the names (hereinafter referred to as names of places) of intersections, cities, villages, towns, etc. by characters.

The data for three-dimensionally displaying the buildings in the road map data include position data and polygon data describing plane shapes and height data of buildings. The recording medium stores type data representing the types of buildings, and text information for displaying the names of buildings by characters.

The position detecting unit 303 is constituted by a GPS receiver 313 for detecting the present position of the car based on a signal from a GPS satellite, a gyrosensor 314, a terrestrial magnetism sensor 315, and a distance sensor 316. The present position of the car can be estimated even when the electromagnetic waves from the GPS satellite cannot be received, based upon the GPS position measuring method that detects the present position of the car based upon signals from a plurality of GPS satellites received by the GPS receiver 313 and upon the estimated navigation method which measures the present position of the car using the data related to the progressing direction and the data related to the traveled distance from the gyrosensor 314, from the terrestrial magnetism sensor 315 and from the distance sensor 316.

In the GPS position measuring method, too, the direction of progress can be obtained from the positions of the car detected maintaining a time interval. The distance sensor 316 directly detects the vehicle speed, and is constituted to detect the distance by integrating the vehicle speed. The gyrosensor 314 and the terrestrial magnetism sensor 315 used in the estimated navigation method both have a function for detecting the direction of progress. Therefore, either one of them may be omitted, e.g., the terrestrial magnetism sensor 315 may be omitted.

The display device 304 is constituted by a liquid crystal display or the like, and displays a road map and a selected picture of a destination as navigation. The group of switches 305 includes various switches arranged on the right, left, upper and lower sides of the display screen of the display unit 304. The remote control unit 307 works as operation means similarly to the group of switches 305. Upon operating various switches of the remote control unit 307, infrared-ray signals of a content corresponding to the operated switch are transmitted. The infrared-ray signals are received by the remote control sensor 306. The VICS transmitter/receiver 311 receives road traffic information sent from the road traffic information communication system (VICS: vehicle information communication system).

The control unit 312 comprises a microcomputer constituted by an input/output (I/O) unit 317, a central processing unit 318, and a memory unit 319. To the I/O unit 316 are connected the above unit for reproducing the map data storage unit 302, GPS receiver 313, gyrosensor 314, terrestrial magnetism sensor 315, distance sensor 316, display device 304, group of switches 305, remote control sensor 306, voice synthesis/output unit 308, VICS transmitter/receiver 311, etc.

The memory unit 319 includes ROM and RAM, the ROM storing a program of navigation. The RAM is used as a work memory and for temporarily storing various data. The central processing unit 318 in the control unit 312 executes various processes based upon various input signals fed to the control unit 312 and upon the programs.

Depending upon the processing functions, the central processing unit 318 can be divided into a present position detecting unit 320, a map data fetching unit 321, a map matching unit 322, a route calculation unit 323, a route guide unit 324, a drawing unit 325 and a screen control unit 326.

First, the present position detecting unit 320 detects the present position of the car and the direction of progress based on signals from a plurality of GPS satellites received by the GPS receiver 313, and finds the present position by calculating the traveling locus of the car based upon the progress direction data from the gyrosensor 314 and terrestrial magnetism sensor 315 and upon the traveling distance data from the distance sensor 316.

The map data fetching unit 321 fetches map data necessary for various processing from the map data storage unit 302, and stores them in the RAM in the memory unit 318. The map matching unit 322 compares the present position of the car found by the present position detecting unit 320 with the road map data obtained from the map data storage unit 302, and specifies on which portion of the road the present position of the car exists.

When the user sets a destination by using the group of switches 305 or the remote control unit 307, the route calculation unit 323 calculates the present position of the car specified by the map matching unit 322 and the route from the start point to the destination specified by the user. The route guide unit 324 judges points necessary for the guidance based upon the route calculated by the route calculation unit 323, shape data of the road, position data of intersections, turning points, railroad crossing, etc. possessed by the map data, and judges what kind of guidance (turn to the right, turn to the left) is necessary. When the guidance is to be produced by voice, the route guide unit 324 produces the voice instruction corresponding to the content of guidance to the voice synthesis/output unit 308, and voice synthesized by the voice synthesis/output unit 308 is produced from the speaker 309.

The screen control unit 326 controls the content displayed by the display unit 304. Being controlled by the screen control unit 326, the drawing unit 325 draws a map showing the present position of the car, a rough sketch of expressways, and an enlarged map near an intersection when the car has approached the intersection, the drawing being displayed on the screen of the display unit 304. In response to an instruction from the screen control unit 326, the drawing unit 325 displays the present position of the car detected by the present position detecting unit 320 and a car mark P (see FIG. 25) representing the direction of progress on the map displayed on the display unit 304.

When a traffic jam is learned from road traffic information received by the VICS transmitter/receiver 311, the screen control unit 326 instructs the drawing unit 325 to display the content by characters, and the drawing unit 325 displays the characters corresponding to the instructed content on the display screen of the display unit 304.

Here, the map displayed on the display unit 304 by the drawing unit 325 includes roads as well as buildings that are displayed in a three-dimensional manner in the areas to be displayed. According to this embodiment, buildings at a distance away from the car by more than a predetermined distance are not displayed, so that the road map can be easily viewed avoiding complexity.

Figure 27:
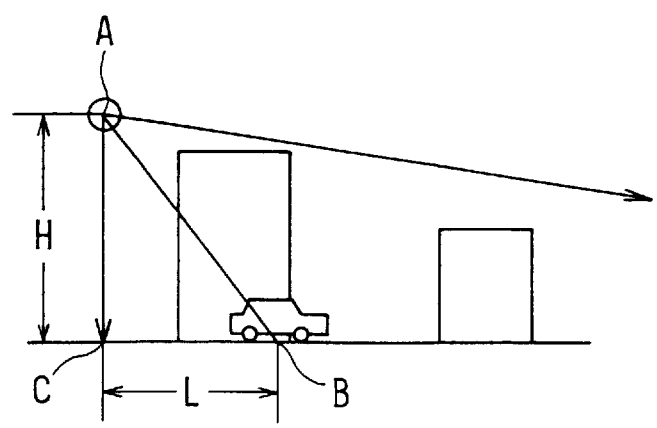
FIG. 27 is a diagram illustrating the viewing point according to a bird's-eye view on a 3-D map.

The roads and buildings are three-dimensionally displayed in the form of a bird's-eye view. The viewing point A of the bird's-eye view is located, as shown in FIG. 27, just over a point C (shadow of viewing point) behind the present position B of the car by a predetermined distance L, and the height (altitude of viewing point) H can be changed in a plurality of steps or steplessly (continuously) by operating a predetermined switch in the group of switches 305.

In this embodiment, the road map displayed on the display unit 304 can be changed over between the one in which the names of places and buildings are also displayed by characters and the one in which such characters are not displayed.

Figure 25A:
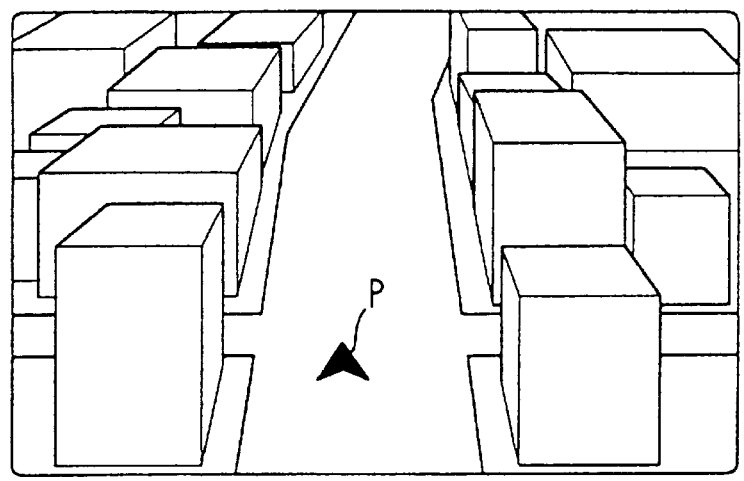
FIG. 25A is an example of the screen on which buildings are three-dimensionally drawn without displaying the names of the buildings of a ninth embodiment.
Figure 25B:
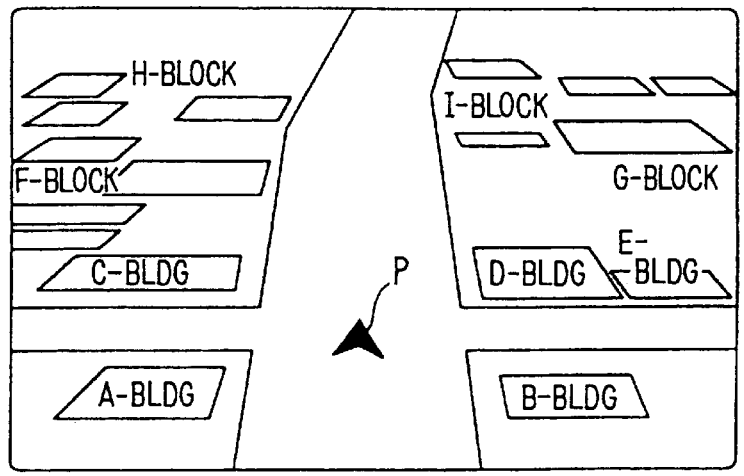
FIG. 25B is an example of the screen on which buildings are two-dimensionally drawn with displaying the names of the buildings of the ninth embodiment.

When the names of places and buildings are to be displayed by characters on the map displayed on the display unit 304, the buildings are displayed, as shown in FIG. 25B, in a manner of occupying their sites as their plane shapes are shown in the form of a bird's-eye view. When the names of places or buildings are not displayed by characters, the buildings are displayed in a normal three-dimensional manner as shown in FIG. 25A.

In the case of this embodiment, the characters are displayed or are not displayed by selecting the mode of displaying the buildings. The mode of displaying the buildings is selected by operating a predetermined switch in the group of switches 305 or by operating a predetermined switch of the remote control unit 307.

Figure 26:
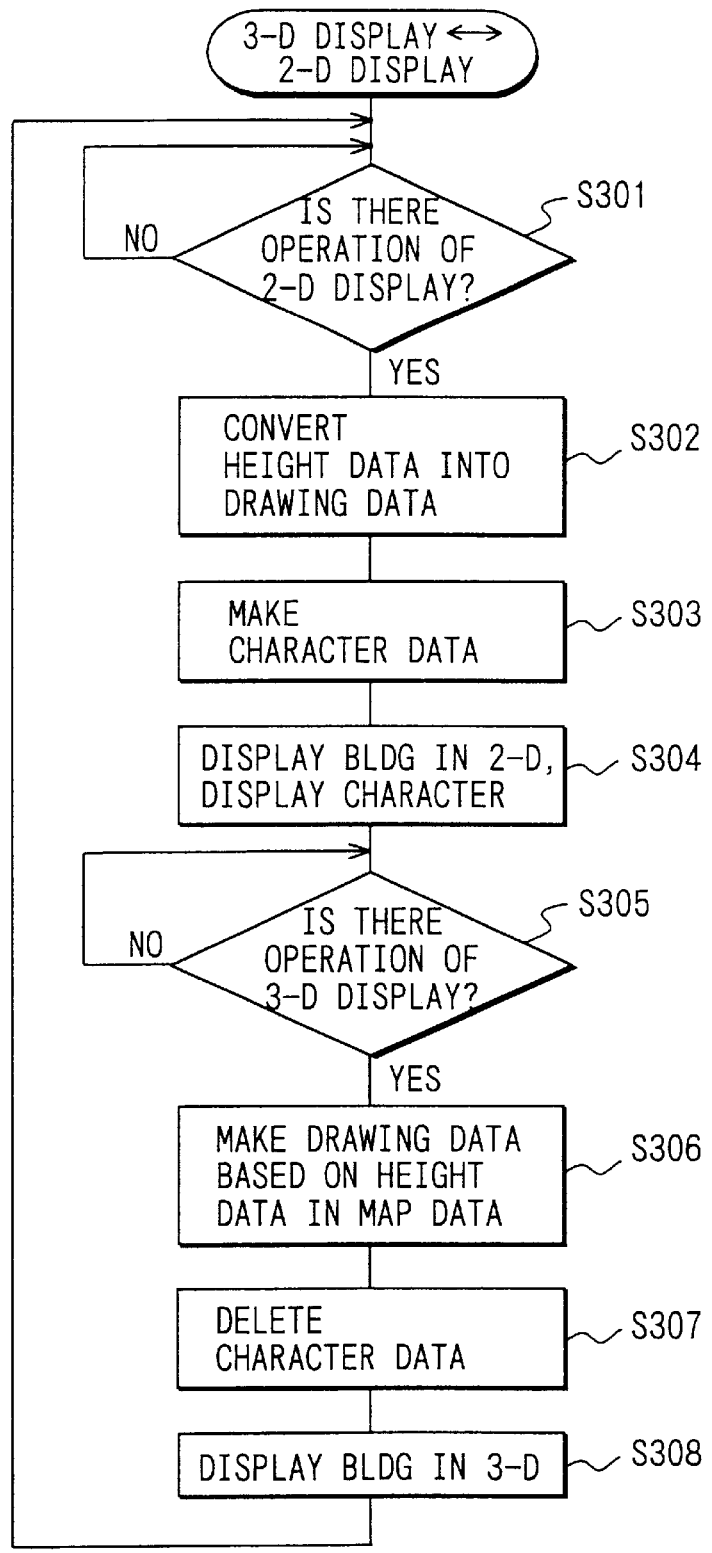
FIG. 26 is a flowchart illustrating a process of switching a display mode.

Described below with reference to a flowchart of FIG. 26 are a case where the road map is displayed on the display unit 304 together with the characters telling the names of places and buildings and a case where the road map is displayed without accompanied by such characters.

First, when the car is traveling, the map displayed on the display unit 304 is successively scrolled as the car travels. That is, when the present position detecting unit 320 detects the motion of the car, the map data fetching unit 321 reads out the map data of a range displayed on the screen of the display unit 304 from the map data storage unit 302 relying on the position of the car after it has moved, and stores them in the RAM in the memory unit 319. Thereafter, the screen control unit 326 reads out the data from the RAM in the memory unit 319, and the drawing unit 325 three-dimensionally displays the roads and buildings on the display unit 304 being controlled by the screen control unit 326. At this moment, the screen control unit 326 does not make an access to the text data such as names of places or names of buildings. Accordingly, the roads and buildings are three-dimensionally displayed on the screen of the display unit 304 without accompanied by the display of characters of the names of places and buildings (see FIG. 25A).

When the road map is three-dimensionally displayed on the display unit 304 with the present position of the car as a center, the screen control unit 326 is placed in a state of judging whether the plane display is selected by operating the group of switches 305 or by operating the remote control unit 307 (step S301).

When the plane display is selected, the screen control unit 326 renders the judgment "YES" at step S301, and the routine proceeds to step S302 where the height data of the buildings are converted. In this embodiment, the height data are converted by setting the heights of buildings to be all "0". By treating the heights of buildings as "0", the screen control unit 326 makes access to the RAM in the memory unit 319 to read out plane shapes of buildings, and prepares the drawing data expressing their plane shapes in the form of a bird's-eye view.

Next, the routine proceeds to step S303 where the screen control unit 326 makes an access to the RAM in the memory unit 319 to read out character data of the names of places and buildings, and prepares character drawing data such as of the names of places and buildings in compliance with the character data. Thereafter, the drawing unit 325 draws the plane shapes of the buildings expressed by the bird's-eye view and the names of places and buildings on the screen of the display unit 304 as shown in FIG. 25B based upon the drawing data expressing the plane shapes of the buildings in the form of a bird's-eye view and upon the drawing data of the names of places and buildings (step S304).

Thereafter, the screen control unit 326 judges whether the three-dimensional display is selected by the operation of the group of switches 305 or of the remote control unit 307 (step S305). When the three-dimensional display is selected, the screen control unit 326 renders the judgment "YES" at step S305, and makes access at step S306 to the RAM in the memory unit 319 to read out plane shapes and heights of the buildings, and prepares three-dimensional drawing data in the form of a bird's-eye view.

Then, at step S307, the screen control unit 326 erases drawing data such as of the names of places and buildings. Thereafter, as shown in FIG. 25A, the drawing unit 325 three-dimensionally draws the buildings on the screen of the display unit 304 based upon the drawing data expressing the buildings in the form of a bird's-eye view, and erases characters of the names of places and buildings from the display unit 304 since the drawing data of the names of places and buildings have been erased (step S308).

Thereafter, the screen control unit 326 returns back to step S301 and judges whether the plane display is selected. Hereinafter, when the plane display and the three-dimensional display are selected, the operations are alternately repeated to produce the plane display of the buildings together with the characters of the names of places and buildings, and to produce the three-dimensional display of the buildings without accompanied by the characters of the names of places and buildings.

According to this embodiment as described above, it is allowed to select a display for displaying the characters of the names of places and buildings on the map displayed on the display unit 304, and a display for not displaying such characters. When the display with characters is selected, the names of principal places and buildings are displayed on the map decreasing cumbersome operation which, so far, had to be effected for every place or building when it was desired to know its name.

Besides, when the names of places and buildings are to be displayed, the heights of the buildings are lowered or, in this embodiment, the buildings are displayed flat eliminating such an inconvenience that the buildings are overlapped back and force making it difficult to recognize their names.

When the road map displayed on the display unit 304 is updated in a scrolling manner accompanying the traveling of the car, the buildings and the like maybe three-dimensionally displayed each time irrespective of which one of the three-dimensional display or the plane display has been selected, or the buildings and the like may be displayed in a mode that is selected at the time of updating the road map by scrolling.

In the case of the three-dimensional display while updating the road map in a scrolling manner, the burden of the control unit 312 can be decreased by an amount of character display. In the case of the plane display, on the other hand, the burden of the control unit 312 can be decreased by an amount of operation for three-dimensionally displaying the buildings. In either case, the display of the map can be updated within a decreased period of time.

Tenth Embodiment

Figure 29A:
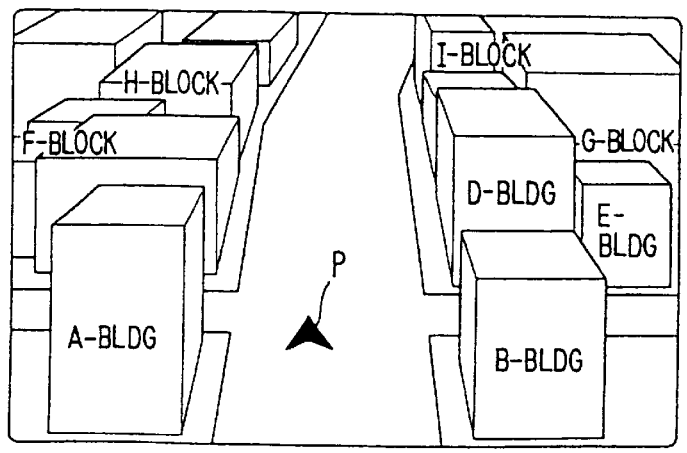
FIG. 29A is an example of the screen on which buildings are three-dimensionally drawn with displaying the names of the buildings of a tenth embodiment.
Figure 29B:
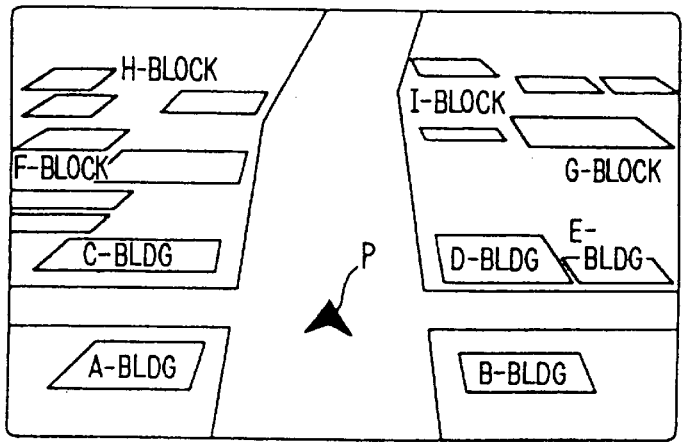
FIG. 29B is an example of the screen on which buildings are two-dimensionally drawn with displaying the names of the buildings of the tenth embodiment.
Figure 30:
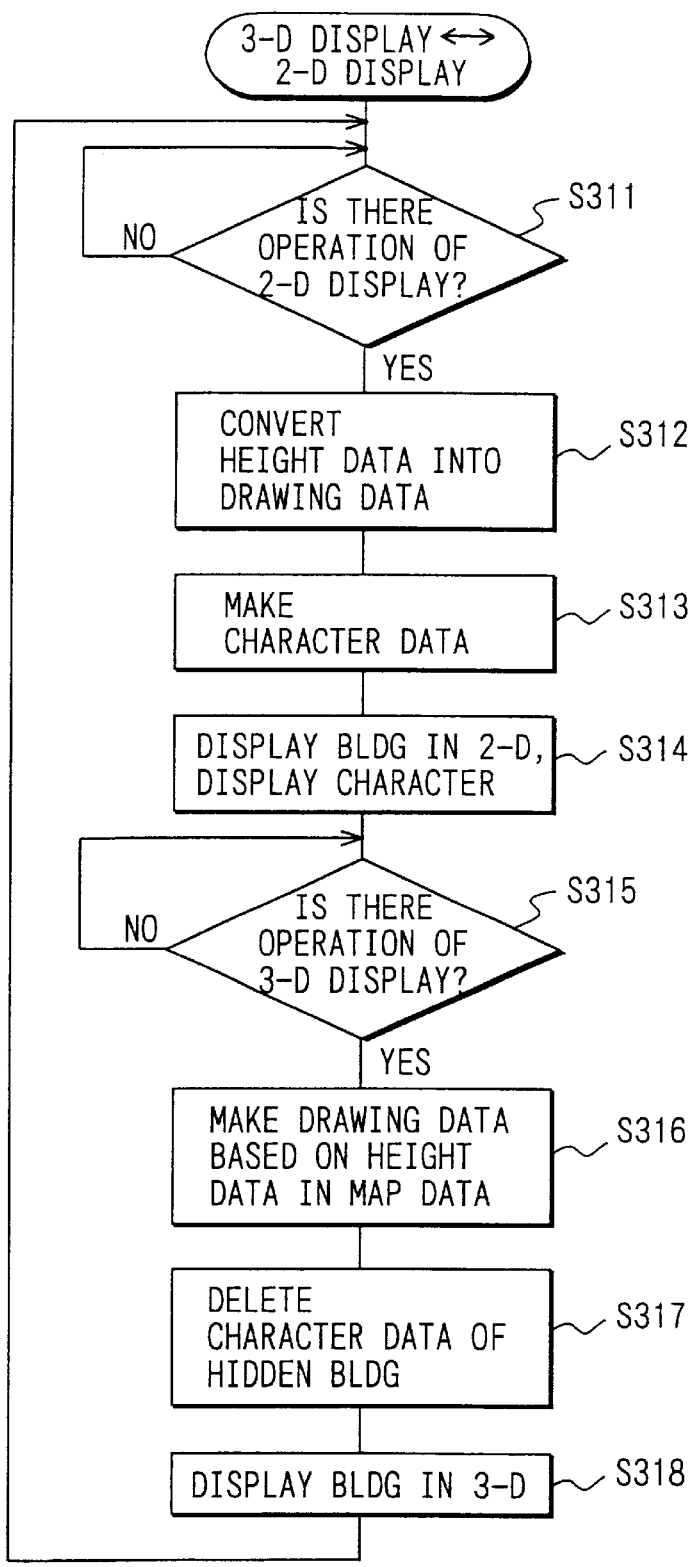
FIG. 30 is a flow chart illustrating a process of switching a display mode.

FIGS. 29A, 29B and 30 illustrate a tenth embodiment of the invention which is different from the above ninth embodiment with respect to that the display of names of places and buildings is not erased even when the buildings are three-dimensionally displayed. In this case, the display of names is erased for those buildings which are only partly drawn being hidden by high buildings. For example, a building C of FIG. 29B is only partly shown in FIG. 29A being hidden by a building A and, hence, the name of the building C is not displayed. This makes easy to recognize the display of the map. FIG. 30 is a flowchart illustrating the content of control when the three-dimensional display is to be executed according to the tenth embodiment.

Figure 31:
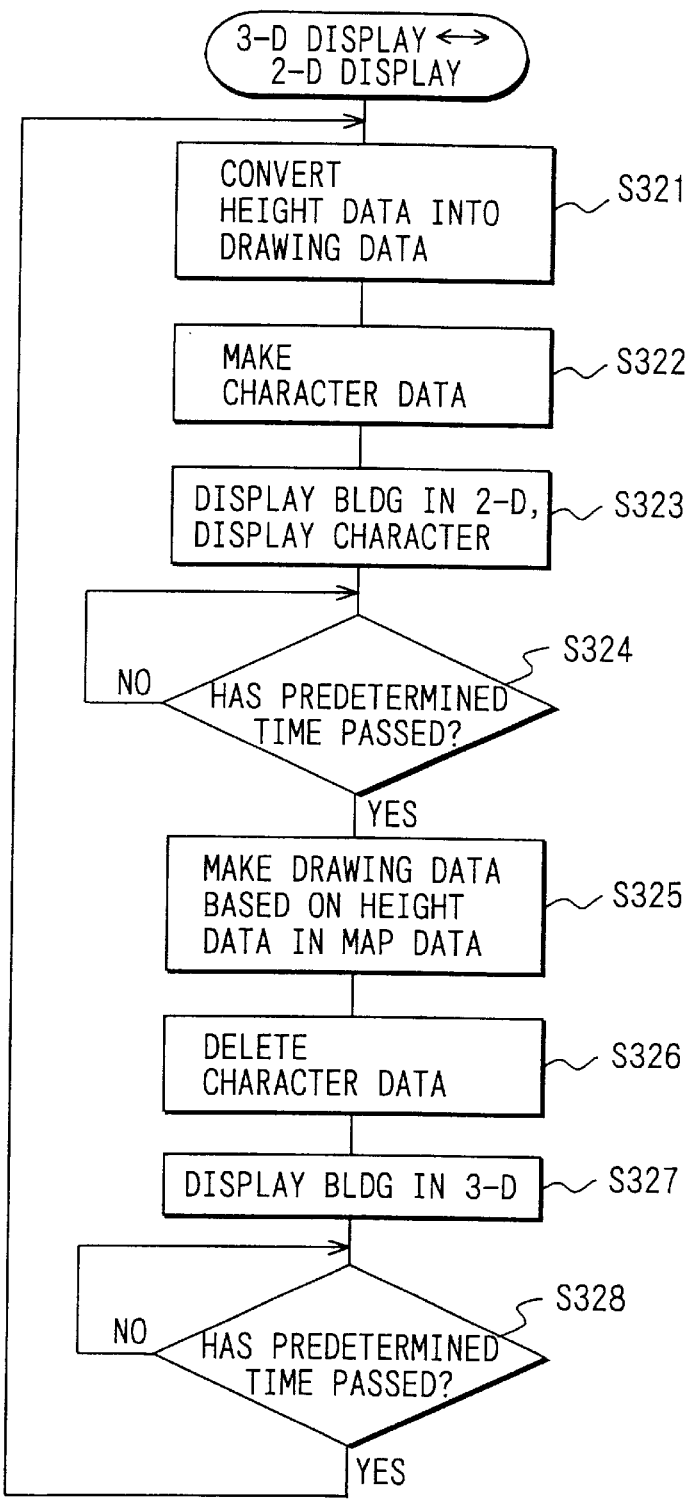
FIG. 31 is a flowchart illustrating a process of switching a display mode of an eleventh embodiment.

FIG. 31 illustrates the content of control of when the three-dimensional display is to be executed according to an eleventh embodiment of the invention, which is different from the above ninth embodiment with respect to that the plane display of the buildings, etc. (with the display of characters) and the three-dimensional display (without the display of characters) are alternately repeated after a predetermined time interval.

This constitution does not require the operation of switches and contributes to enhancing the safety during the travel of the car.

The invention is not limited to the embodiments described above and shown in the drawings, but can also be expanded or changed.

Figure 32A:
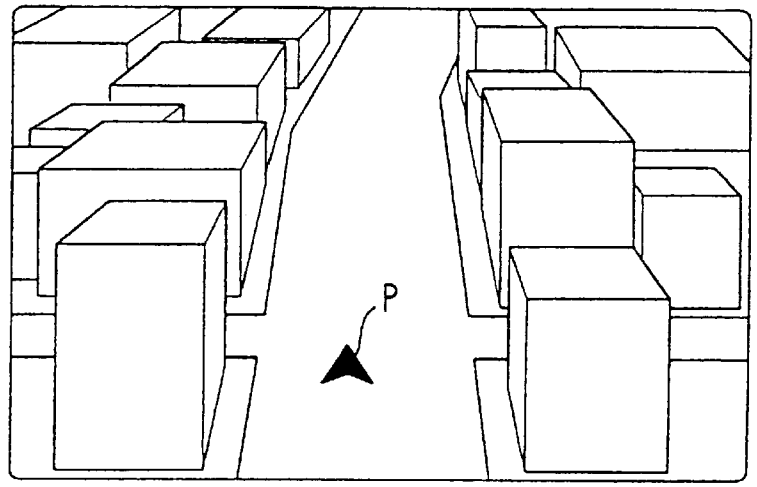
FIG. 32A is an example of the screen on which buildings are three-dimensionally drawn without displaying the names of the buildings of a first modification of the ninth to eleventh embodiments.
Figure 32B:
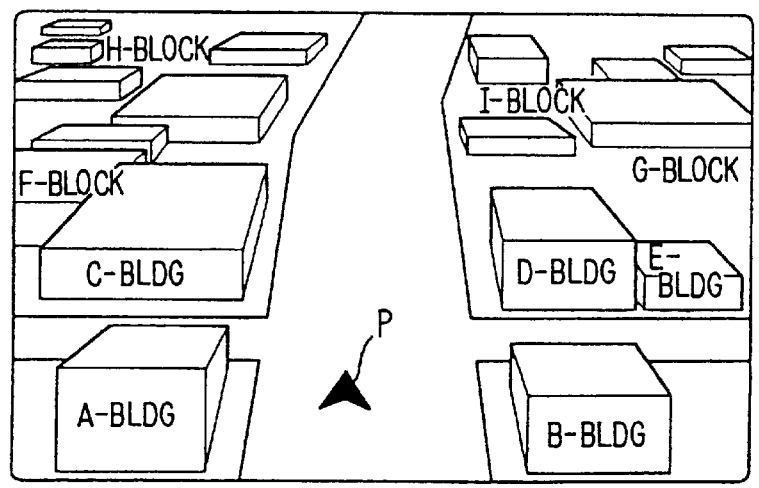
FIG. 32B is an example of the screen on which buildings are three-dimensionally drawn with displaying the names of the buildings of the first modification.

The height data at steps S302, S312 and S321 of the ninth to eleventh embodiments may be converted into those of the heights of buildings stored in the map data multiplied by a predetermined value smaller than 1 to three-dimensionally display them as shown in FIGS. 32A and 32B.

Further, the height data at steps S302, S312 and S321 of the ninth to eleventh embodiments may be converted presuming that the buildings all have a predetermined height (e.g., one meter), and may be three-dimensionally drawn.

In converting the height data at steps S302, S312 and S321 of the ninth to eleventh embodiments, further, landmark buildings such as Tokyo Tower and the like may be three-dimensionally drawn maintaining heights as described in the map data, so that the present position can be more easily confirmed.

Figure 33A:
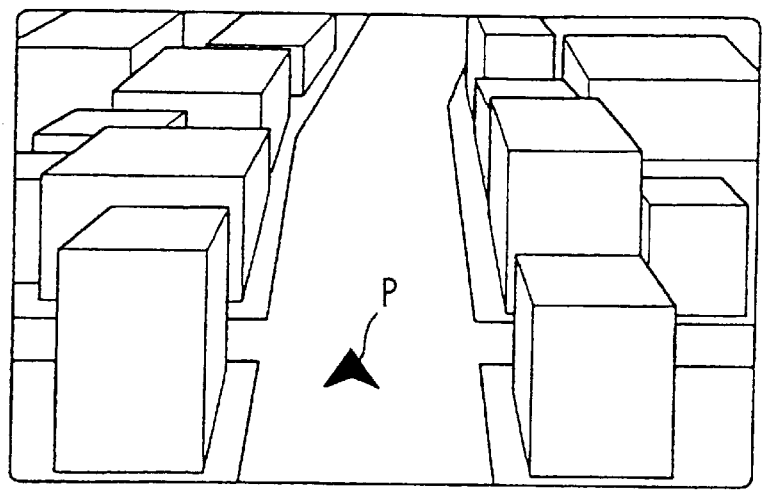
FIG. 33A is an example of the screen on which buildings are three-dimensionally drawn without displaying the names of the buildings of a first modification of the ninth to eleventh embodiments.
Figure 33B:
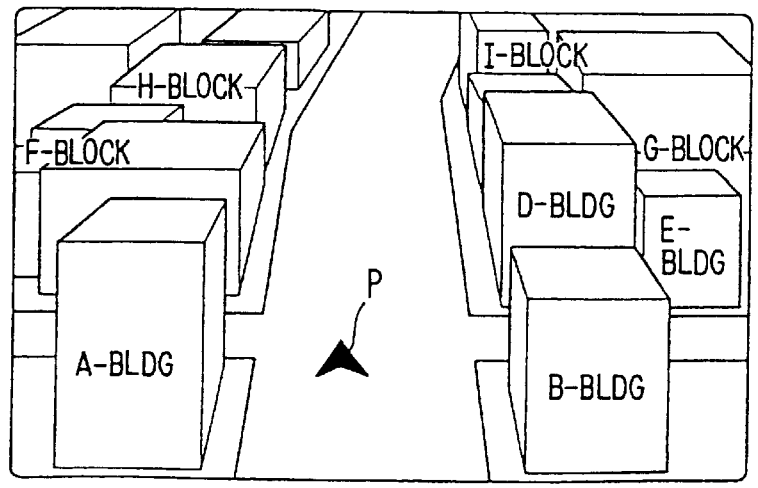
FIG. 33B is an example of the screen on which buildings are three-dimensionally drawn with displaying the names of the buildings of the first modification.
Figure 34A:
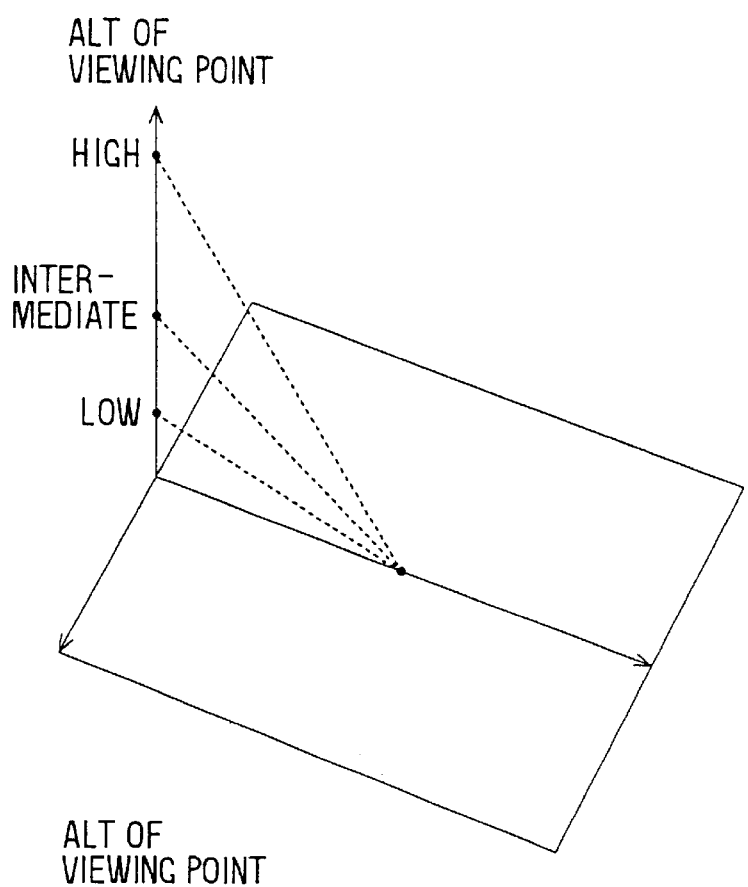
FIGS. 34A and 34B are diagrams illustrating a setting of the altitude of the viewing point of a prior art.
Figure 34B:
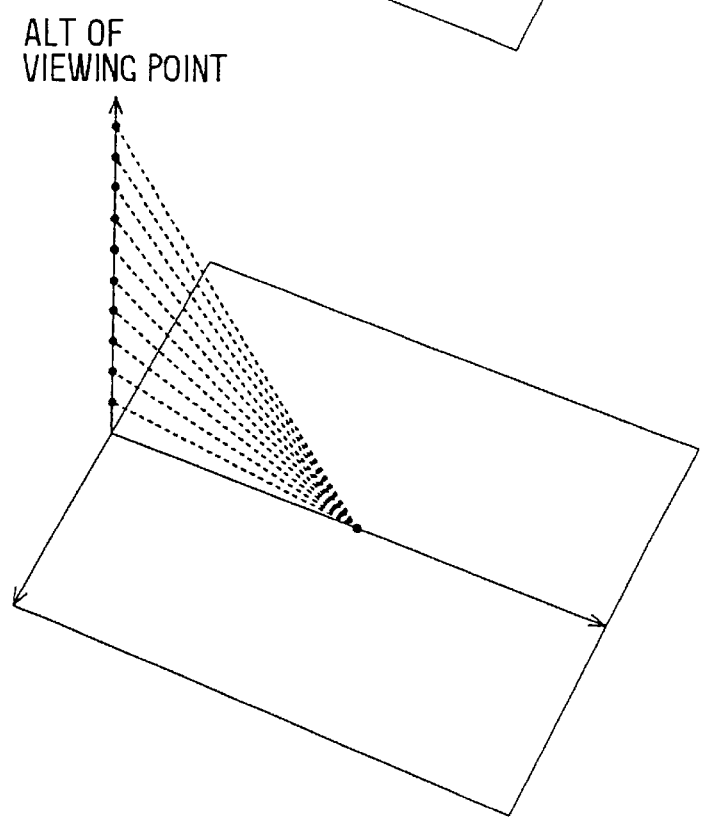
Figure 35A:
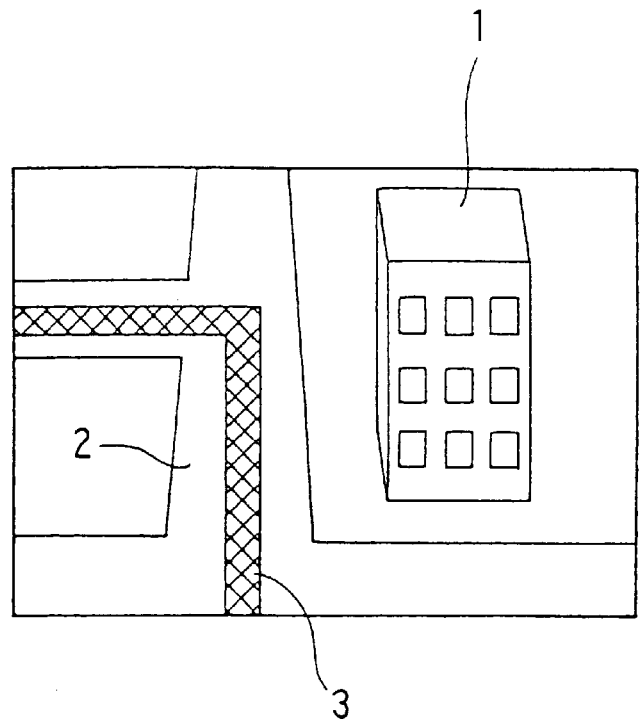
FIGS. 35A and 35B are examples of the screen on which buildings are three-dimensionally drawn.
Figure 35B:
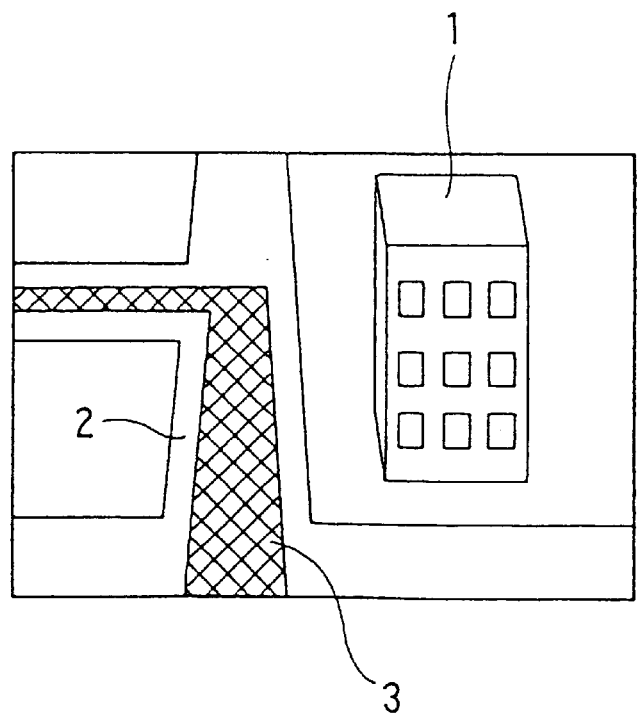

As shown in FIGS. 33A and 33B, further, the buildings may be three-dimensionally displayed irrespective of whether the characters representing the names of buildings are displayed or not.

In the above embodiments, further, characters of the names of places may not be displayed on the three-dimensionally displayed map.

The invention is not limited to the navigation devices for cars but can be widely applied to map display devices in general. The invention can be favorably applied to portable devices.

What is claimed is:

1. A map display device for three-dimensionally displaying a map of facilities including at least one of a building and a road on a screen, the map display device comprising display control means for three-dimensionally displaying, by using a polygon, a design that represents traffic regulation information at a predetermined height above ground on the map on the screen, wherein the display control means displays the design in a form that corresponds to a view of the design seen from a viewing point on the map displayed on the screen, and when an angle of depression of a viewing direction from a viewing point to a particular point on the map exceeds a predetermined angle, the display control means changes the three-dimensional design, which represents the traffic regulation information, to a corresponding plane design.

2. A map display device according to claim 1, wherein the display control means three-dimensionally displays at least part of a guidance line on the map.

3. A map display device according to claim 2, wherein the display control means three-dimensionally displays the at least part of the guidance line by combining one or more three-dimensional drawings.

4. A map display device according to claim 2, wherein the display control means displays the at least part of the guidance line in a form that corresponds to a view of the at least part of the guidance line seen from a viewing point on the map displayed on the screen.

5. A map display device according to claim 2, wherein the display control means controls a display color of those portions of the guidance line that are to be hidden by the facilities in a color that is different from a color of any other portion of the guidance line.

6. A map display device according to claim 5, wherein the display control means displays, in a semitransparent manner, those portions of the guidance line that are hidden by the facilities.

7. A map display device according to claim 5, further comprising input means for selecting the execution of the display color control, wherein the display control means controls the display color based on a selection signal from the input means.

8. A map display device according to claim 5, wherein the display control means three-dimensionally displays the entire guidance line.

9. A map display device according to claim 2, wherein the display control means three-dimensionally displays each corresponding one of the facilities together with a facility identification mark on a surface of the facility.

10. A map display device according to claim 9, wherein the display control means displays each of the three-dimensionally displayed facilities in a corresponding form that corresponds to a view of the facility seen from a viewing point on the map displayed on the screen.

11. A map display device according to claim 1, wherein the map display device is for a vehicle navigation device.

12. A map display device for three-dimensionally displaying a map of facilities including at least one of a building and a road on a screen, the map display device comprising display control means for three-dimensionally displaying, by using a polygon, a design that represents traffic regulation information at a predetermined height above ground on the map on the screen, wherein the display control means displays a design in a form that corresponds to a view of the design seen from a viewing point on the map displayed on the screen, and when an angle of a viewing direction from a viewing point to the design, which represents the traffic regulation information, exceeds a predetermined angle, the display control means changes the three-dimensional design, which represents the traffic regulation information, to a corresponding plane design.

13. A map display device for three-dimensionally displaying a map of facilities including at least one of a building and a road on a screen, the map display device comprising display control means for three-dimensionally displaying, by using a polygon, a design that represents traffic regulation information at a predetermined height above ground on the map on the screen, wherein the display control means displays the design in a form that corresponds to a view of the design seen from a viewing point on the map displayed on the screen, and the display control means is also for displaying a plane design, which represents the same traffic regulation information as that of the three-dimensional design, simultaneously with the three-dimensional design.

14. A map display device for three-dimensionally displaying a map of facilities including at least one of a building and a road on a screen, the map display device comprising display control means for three-dimensionally displaying, by using a polygon, a design that represents traffic regulation information at a predetermined height above ground on the map on the screen and road information receiver means for receiving road traffic information, wherein:

the display control means displays the design in a form that corresponds to a view of the design seen from a viewing point on the map displayed on the screen;

the display control means three-dimensionally displays at least part of a guidance line on the map; and the display control means three-dimensionally displays information such as traffic jam, congestion or vacancy on the road or along the road based upon traffic information received by the road information receiver means.

15. A map display device for three-dimensionally displaying a map of facilities including at least one of a building and a road on a screen, the map display device comprising display control means for three-dimensionally displaying, by using a polygon, a design that represents traffic regulation information at a predetermined height above ground on the map on the screen, wherein:

the display control means displays the design in a form that corresponds to a view of the design seen from a viewing point on the map displayed on the screen;

the display control means three-dimensionally displays at least part of a guidance line on the map;

the display control means three-dimensionally displays each corresponding one of the facilities together with a facility identification mark on a surface of the facility; and the display control means displays an entrance/exit of each corresponding one of the three-dimensionally displayed facilities on a corresponding surface of the facility at a position that corresponds to a position of an entrance/exit of a corresponding real facility.

16. A map display device comprising:
map data storage means for storing map data;
display means for three-dimensionally displaying facilities on a map based upon the map data; and
selecting means for selecting one of:
a first display mode for displaying each of the facilities together with at least one character that represents a name of the facility on the map displayed on the display means; and
a second display mode for displaying each of the facilities without displaying any character that represents a name of the facility, wherein when the selecting means selects the first display mode, each of the facilities is displayed in one of a three-dimensional form with a reduced height and a plane form.

17. A map display device comprising:
map data storage means for storing map data;
display means for three-dimensionally displaying facilities on a map based upon the map data; and
selecting means for selecting one of:
a first display mode for displaying each of facilities in a three-dimensional form without modifying a height of the facility together with at least one character that represents a name of the facility on the map displayed on the display means; and
a second display mode for displaying each of the facilities in one of:
a three-dimensional form, which has a reduced height, together with at least one character that represents a name of the facility on the map displayed on the display means; and
a plane form together with at least one character that represents a name of the facility on the map displayed on the display means.

18. A map display device for a vehicle navigation device, wherein the map display device three-dimensionally displays facilities, which include at least one of a building and a road, on a screen in a form of a three-dimensional map and also displays a route guidance line, which leads to a destination, on the three-dimensional map, the map display device comprising:

display control means for three-dimensionally displaying at least part of the route guidance line on the three-dimensional map displayed on the screen; and a switch data input unit, through which an altitude of a viewing point on the three-dimensional map is changed, wherein the display control means three-dimensionally displays the at least part of the route guidance line on the three-dimensional map in a form that changes consistently with the altitude of the viewing point that is changed through the switch data input unit.

19. A map display device according to claim 18, wherein the display control means three-dimensionally displays the at least part of the route guidance line on the three-dimensional map using a combination of:

a plane that is generally parallel to the horizontal plane of the three-dimensional map; and a plane that is generally perpendicular to the horizontal plane of the three-dimensional map.

20. A map display device for a vehicle, wherein the map display device displays a three-dimensional map on a screen and also displays a cursor, which indicates a present position of the vehicle, on the three-dimensional map, the map display device comprising:

input means for inputting an altitude-changing instruction for changing an altitude of a viewing point on the three-dimensional map; and screen control means for:
setting an altitude of the viewing point on the three-dimensional map based on the altitude-changing instruction, which is inputted through the input means; and
adjusting an angle of depression of a viewing direction from the viewing point on the three-dimensional map based on the set altitude of the viewing point, wherein:
the angle of depression of the viewing direction is adjusted such that when the altitude of the viewing point is increased to show a greater area on the three-dimensional map through operation of the input means toward an altitude-increasing side, a ratio of change in the angle of depression of the viewing direction on the three-dimensional map increases;

when the altitude of the viewing point is increased, a position of the cursor on the three-dimensional map moves toward an upper side of the three-dimensional map displayed on the screen and is displayed on the three-dimensional map as viewed from the viewing point;

the angle of depression of the viewing direction is also adjusted such that when the altitude of the viewing point is decreased to show a less area in greater detail on the three-dimensional map through operation of the input means toward an altitude-decreasing side, the ratio of change in the angle of depression of the viewing direction on the three-dimensional map decreases;

when the altitude of the viewing point is decreased, the position of the cursor on the three-dimensional map moves toward a lower side of the three-dimensional map displayed on the screen and is displayed on the three-dimensional map as viewed from the viewing point; and when the viewing point substantially coincides with the present position of the vehicle through operation of the input means, the three-dimensional map is displayed on the screen as a driver's view, and the cursor is not displayed on the three-dimensional map.

21. A map display device according to claim 20, wherein a viewing distance L between the viewing point and the present position of the vehicle indicated by the cursor on the three-dimensional map is expressed by the following equation:

$$L = H \cdot \operatorname{cosec} \theta$$

where H is the altitude of the viewing point, and $\theta$ is the angle of depression of the viewing direction.

22. A map display device according to claim 20, wherein the screen control means is capable of adjusting the viewing direction toward the upper side or the lower side independently of the altitude of the viewing point.

23. A map display device according to claim 20, wherein the screen control means adjusts the angle of depression $\theta$ of the viewing direction in a manner that satisfies the following equation:

$$\theta = N \times (\text{MAXIMUM ANGLE OF DEPRESSION} - \text{MINIMUM ANGLE OF DEPRESSION}) + \text{MINIMUM ANGLE OF DEPRESSION}$$

where:

N = log 2 (ALTITUDE OF VIEWING POINT/MINIMUM ALTITUDE OF VIEWING POINT)/log 2 (MAXIMUM ALTITUDE OF VIEWING POINT/MINIMUM ALTITUDE OF VIEWING POINT).

24. A map display device according to claim 20, wherein a particular point, which is located ahead of the viewing point along the viewing direction, on the three-dimensional map is one of:

the present position of the vehicle on the three-dimensional map; and a point that is located ahead of the present position of the vehicle.

25. A map display device according to claim 20, wherein:

a coordinate of the center of the three-dimensional map displayed on the screen is denoted by (X, Y);

the position of the cursor on the three-dimensional map displayed on the screen is set by the screen control means as (X, N·Y)

where:

N is a ratio of change of Y and is expressed by the following equation:

N = log 2 (ALTITUDE OF VIEWING POINT/MINIMUM ALTITUDE OF VIEWING POINT)/log 2 (MAXIMUM ALTITUDE OF VIEWING POINT/MINIMUM ALTITUDE OF VIEWING POINT).

26. A map display device that displays a three-dimensional map on a screen, the map display device comprising:

input means for inputting an altitude-changing instruction for changing an altitude of a viewing point on the three-dimensional map; and screen control means for:

setting an altitude of the viewing point on the three-dimensional map based on the altitude-changing instruction, which is inputted through the input means; and adjusting an angle of depression of a viewing direction from the viewing point on the three-dimensional map based on the set altitude of the viewing point in such a manner that a ratio of change in the angle of depression of the viewing direction on the three-dimensional map is varied depending on the set altitude of the viewing point.

27. A map display device that displays a three-dimensional map on a screen, the map display device comprising:

input means for inputting an altitude-changing instruction for changing an altitude of a viewing point on the three-dimensional map; and screen control means for:

setting an altitude of the viewing point on the three-dimensional map based on the altitude-changing instruction, which is inputted through the input means; and adjusting an angle of depression of a viewing direction from the viewing point on the three-dimensional map based on the set altitude of the viewing point, wherein:

the angle of depression of the viewing direction is adjusted such that when the altitude of the viewing point is increased through operation of the input means toward an altitude-increasing side, a ratio of change in the angle of depression of the viewing direction on the three-dimensional map increases;

when the altitude of the viewing point is increased, the three-dimensional map is displayed as viewed from the viewing point at the increased altitude;

the angle of depression of the viewing direction is also adjusted such that when the altitude of the viewing point is decreased through operation of the input means toward an altitude-decreasing side, the ratio of change in the angle of depression of the viewing direction on the three-dimensional map decreases; and when the altitude of the viewing point is decreased, the three-dimensional map is displayed as viewed from the viewing point at the decreased altitude.

28. A map display device according to claim 27, wherein:

when the altitude of the viewing point is increased through the operation of the input means toward the altitude-increasing side, the ratio of change in the angle of depression of the viewing direction logarithmically increases; and when the altitude of the viewing point is decreased through the operation of the input means toward the altitude-decreasing side, the ratio of change in the angle of depression of the viewing direction logarithmically decreases.

29. A map display device according to claim 28, wherein:

the screen control means exponentially increases the altitude of the viewing point as a function of a number of altitude-changing instructions, which are inputted through the input means upon the operation of the input means toward the altitude-increasing side; and the screen control means exponentially decreases the altitude of the viewing point as a function of a number of altitude-changing instructions, which are inputted through the input means upon the operation of the input means toward the altitude-decreasing side.

30. A map display device for a vehicle, wherein the map display device displays a three-dimensional map on a screen and also displays a cursor, which indicates a present position of the vehicle, on the three-dimensional map, the map display device comprising:

input means for inputting an altitude-changing instruction for changing an altitude of a viewing point on the three-dimensional map; and screen control means for:

setting an altitude of the viewing point on the three-dimensional map based on the altitude-changing instruction, which is inputted through the input means; and adjusting an angle of depression of a viewing direction from the viewing point on the three-dimensional map based on the set altitude of the viewing point, wherein:

the angle of depression of the viewing direction is adjusted such that when the altitude of the viewing point is increased to show a greater area on the three-dimensional map through operation of the input means toward an altitude-increasing side, a ratio of change in the angle of depression of the viewing direction on the three-dimensional map increases;

when the altitude of the viewing point is increased, a position of the cursor on the three-dimensional map moves toward an upper side of the three-dimensional map displayed on the screen and is displayed on the three-dimensional map as viewed from the viewing point;

the angle of depression of the viewing direction is also adjusted such that when the altitude of the viewing point is decreased to show a less area in greater detail on the three-dimensional map through operation of the input means toward an altitude-decreasing side, the ratio of change in the angle of depression of the viewing direction on the three-dimensional map decreases; and when the altitude of the viewing point is decreased, the position of the cursor on the three-dimensional map moves toward a lower side of the three-dimensional map displayed on the screen and is displayed on the three-dimensional map as viewed from the viewing point.

\* \* \* \* \*